United States Patent [19]

Tsuboi et al.

[11] Patent Number: 5,134,435
[45] Date of Patent: Jul. 28, 1992

[54] CAMERA

[75] Inventors: Takayuki Tsuboi; Takashi Kobe, both of Kanagawa, Japan

[73] Assignee: Canon Kabushiki Kaisha, Tokyo, Japan

[21] Appl. No.: 683,103

[22] Filed: Apr. 10, 1991

Related U.S. Application Data

[63] Continuation of Ser. No. 434,606, Nov. 8, 1989, abandoned, which is a continuation of Ser. No. 317,063, Feb. 28, 1989, abandoned, which is a continuation of Ser. No. 191,797, May 2, 1988, abandoned, which is a continuation of Ser. No. 855,171, Apr. 22, 1986, abandoned.

[30] Foreign Application Priority Data

| Apr. 25, 1985 | [JP] | Japan | 60-089741 |
| Apr. 25, 1985 | [JP] | Japan | 60-089742 |
| Apr. 25, 1985 | [JP] | Japan | 60-089743 |
| Apr. 25, 1985 | [JP] | Japan | 60-089744 |

[51] Int. Cl.$^5$ .............................................. G03B 7/08
[52] U.S. Cl. ..................................... 354/435; 354/437; 354/484
[58] Field of Search .................... 354/434–437, 354/429, 439–446, 451, 452, 458, 484, 173.1

[56] References Cited

U.S. PATENT DOCUMENTS

| 4,009,866 | 3/1977 | Iwata et al. | 354/439 |
| 4,053,907 | 10/1977 | Iwata et al. | 354/437 |
| 4,294,527 | 10/1981 | Hashimoto et al. | 354/173.1 |
| 4,325,614 | 4/1982 | Grimes | 354/437 |
| 4,354,748 | 10/1982 | Grimes et al. | 354/437 |
| 4,360,258 | 11/1982 | Hashimoto | 354/435 |
| 4,362,372 | 12/1982 | Kiesel | 354/437 |
| 4,514,075 | 4/1985 | Negishi et al. | 354/446 |
| 4,557,573 | 12/1985 | Johnson et al. | 354/234.1 |
| 4,572,645 | 2/1986 | Yoshida et al. | 354/435 |

FOREIGN PATENT DOCUMENTS 0096925 7/1980 Japan .

Primary Examiner—Russell E. Adams
Attorney, Agent, or Firm—Akoo-Toren

[57] ABSTRACT

A camera including shutter blades; a driving device which, upon receipt of electric energy, drives the shutter blades to open; an optical detecting device for optically detecting the operating state of the shutter blades; and a control circuit which controls the opening speed of the shutter blades by changing the amount of electric energy supplied to the driving device in response to the output of the optical detecting device.

7 Claims, 21 Drawing Sheets

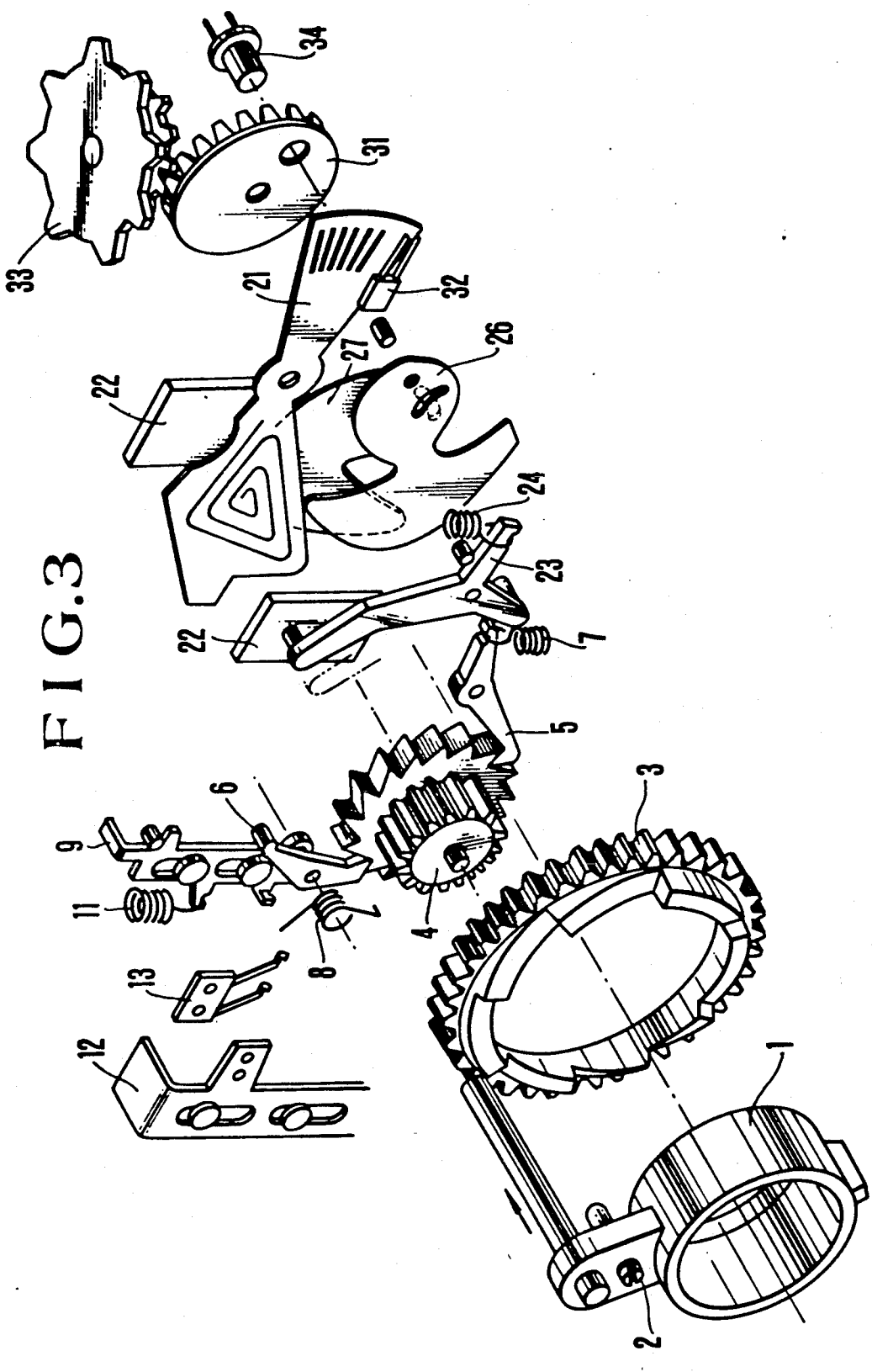

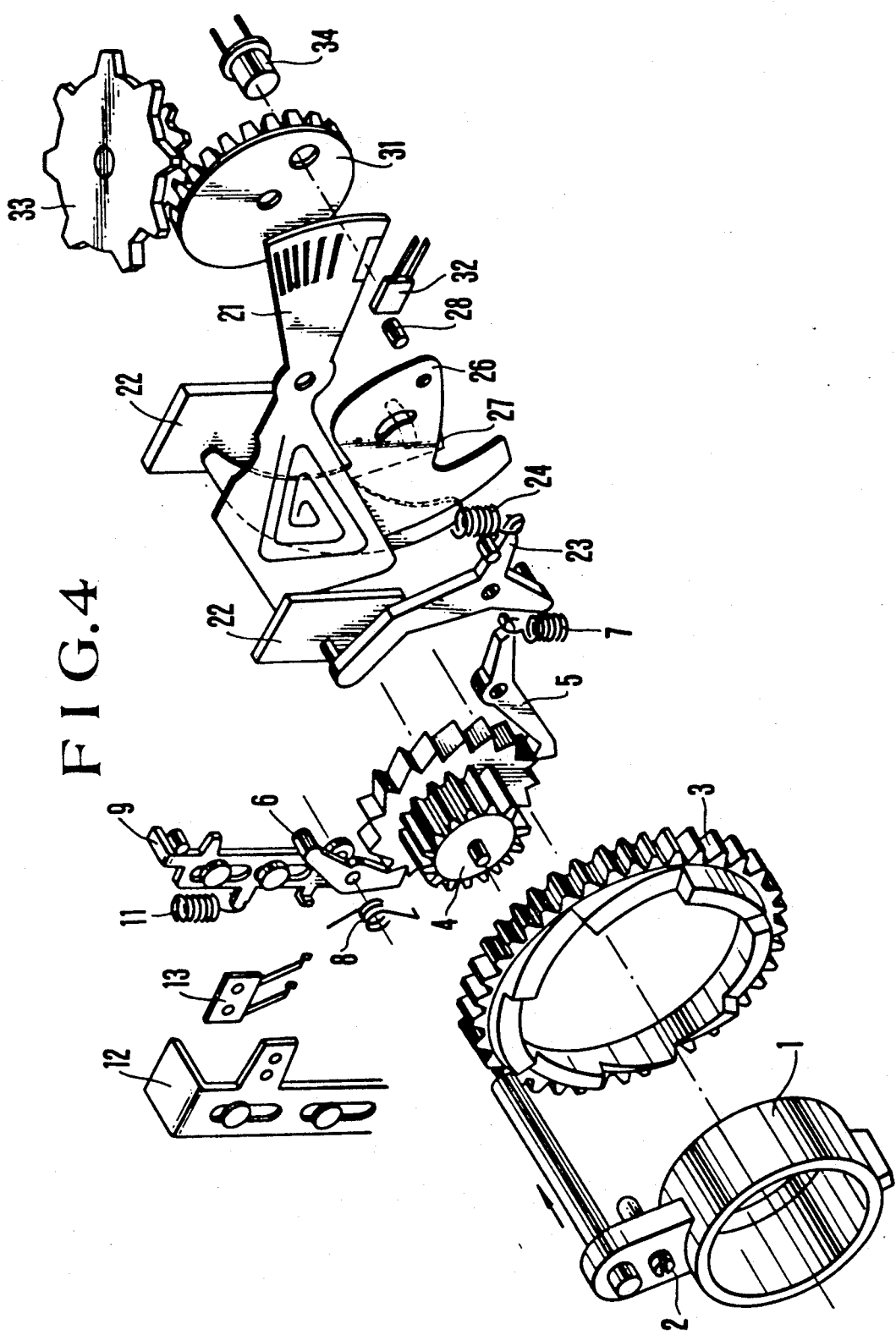

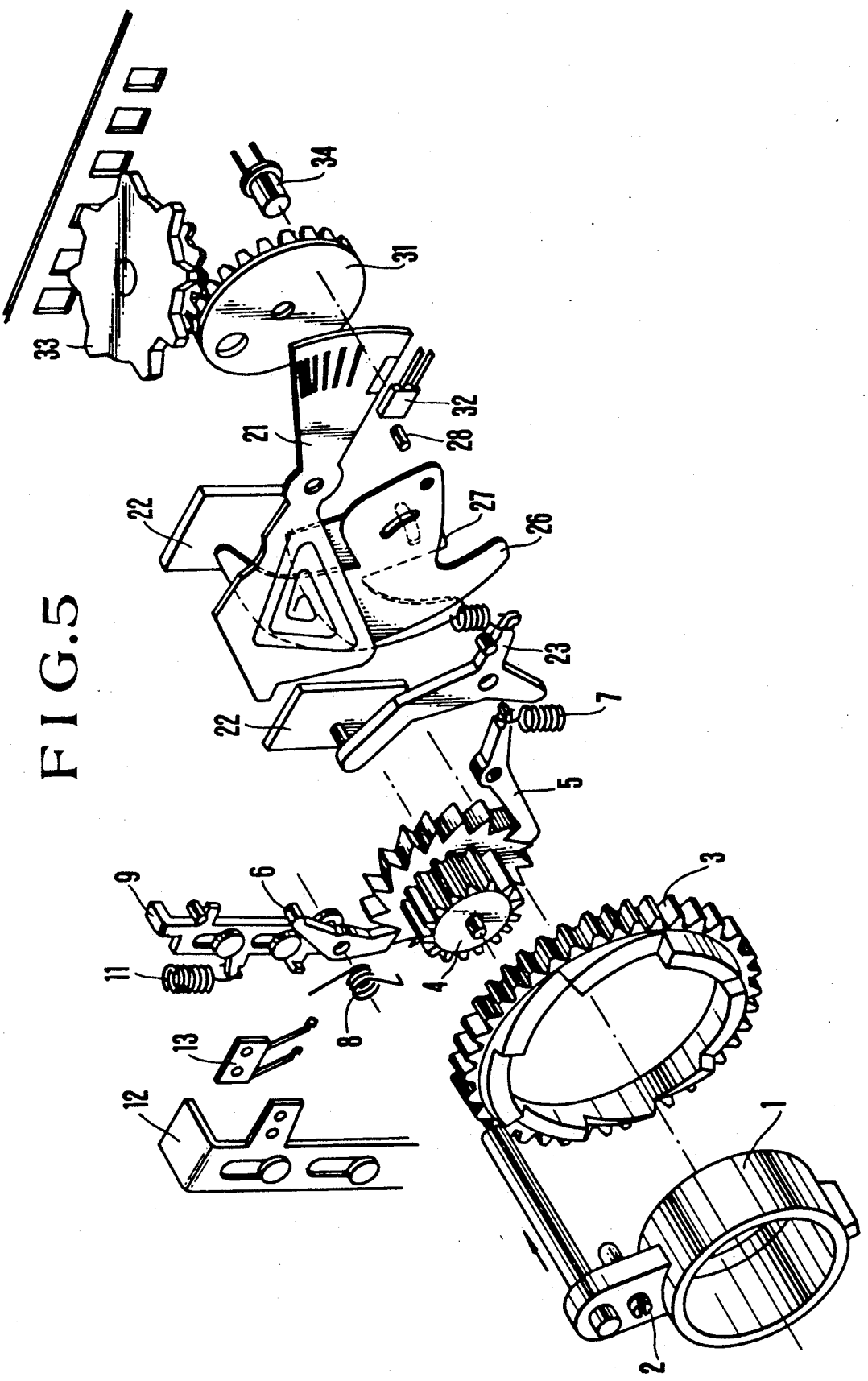

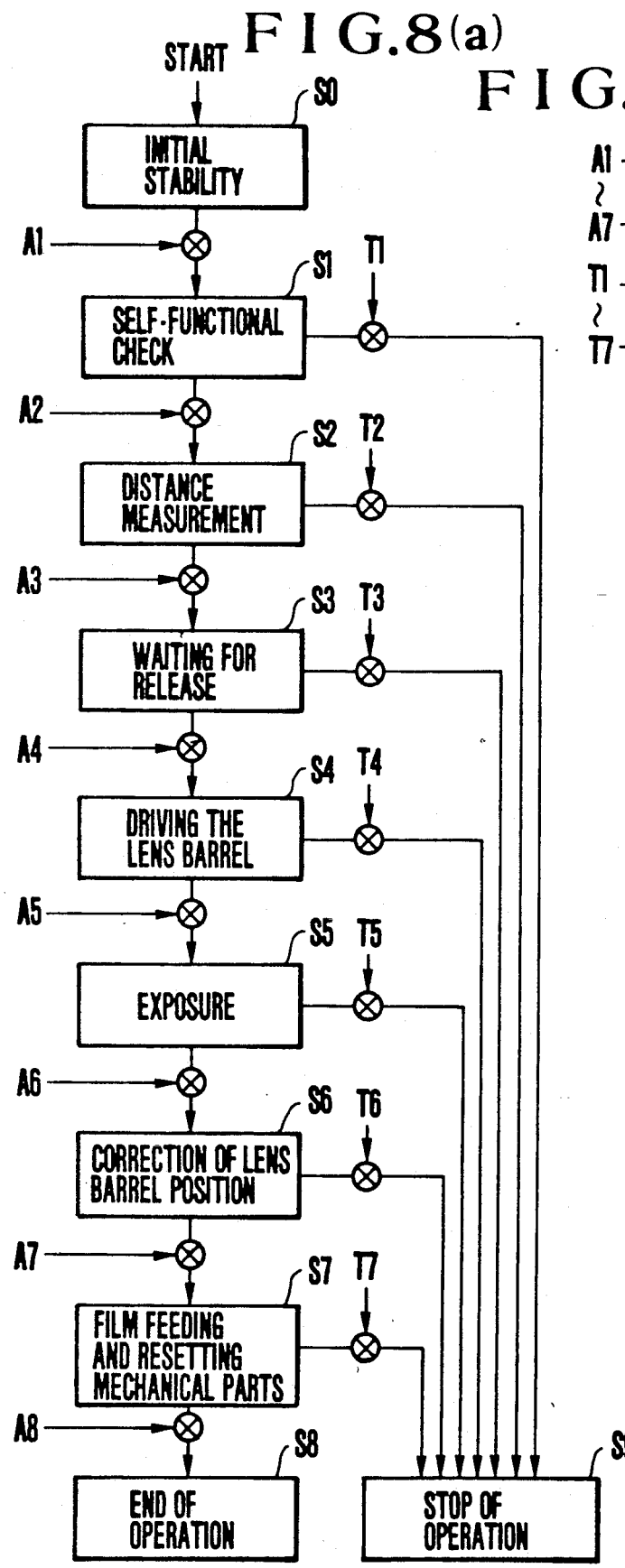

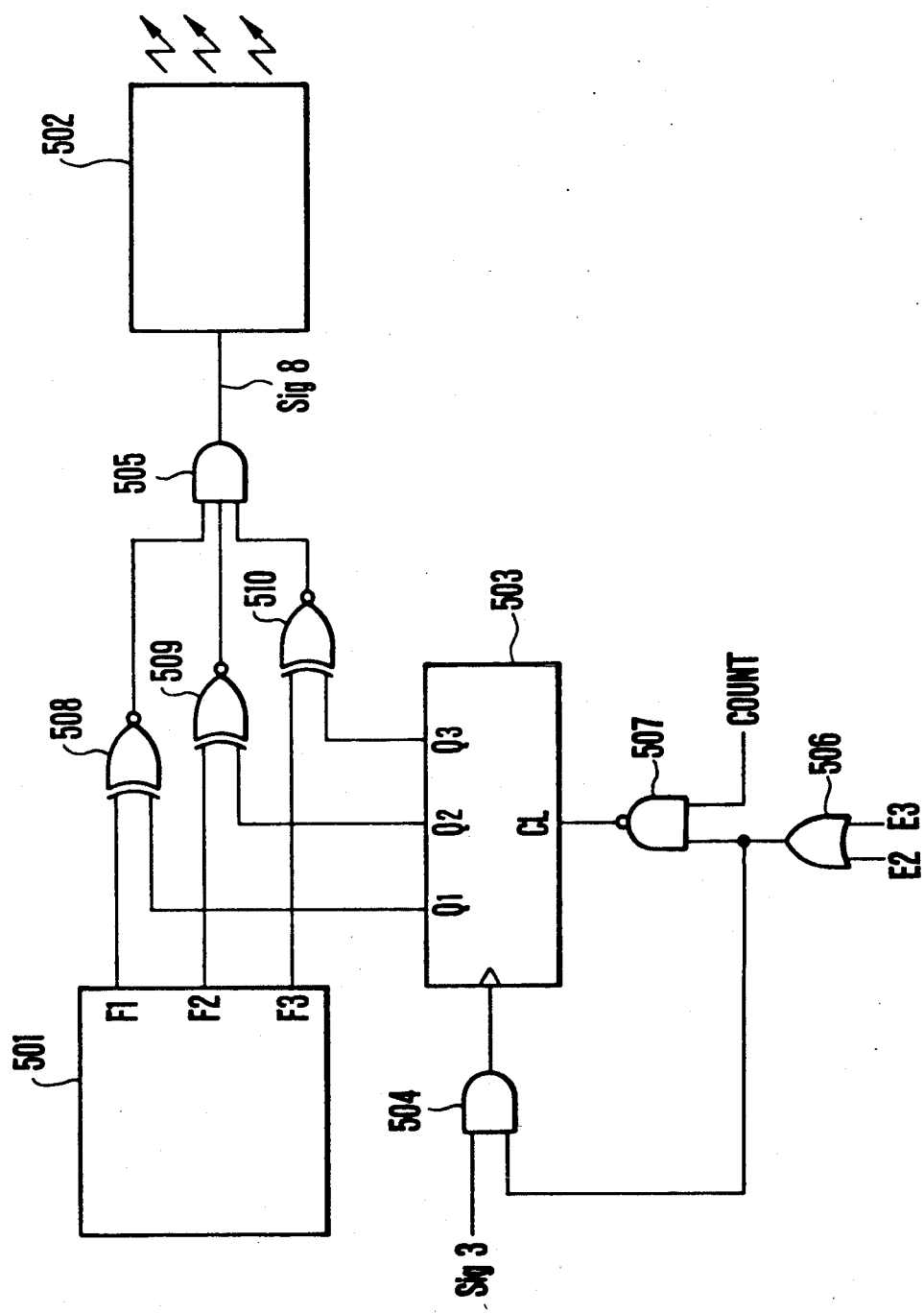

F I G.27(a)
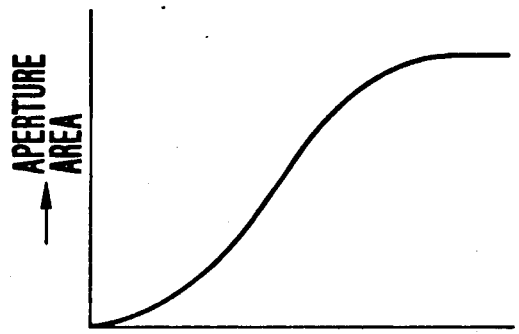
F I G.27(b)
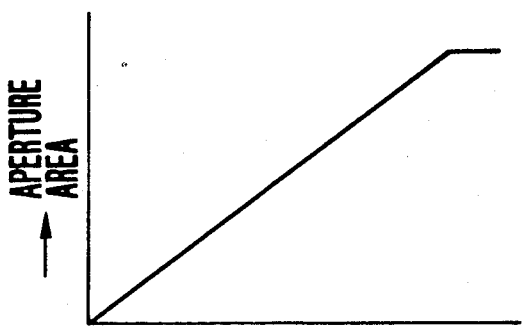
F I G.27(c)
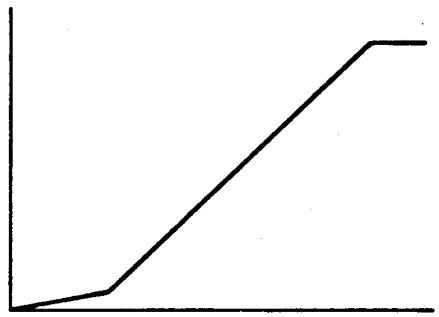

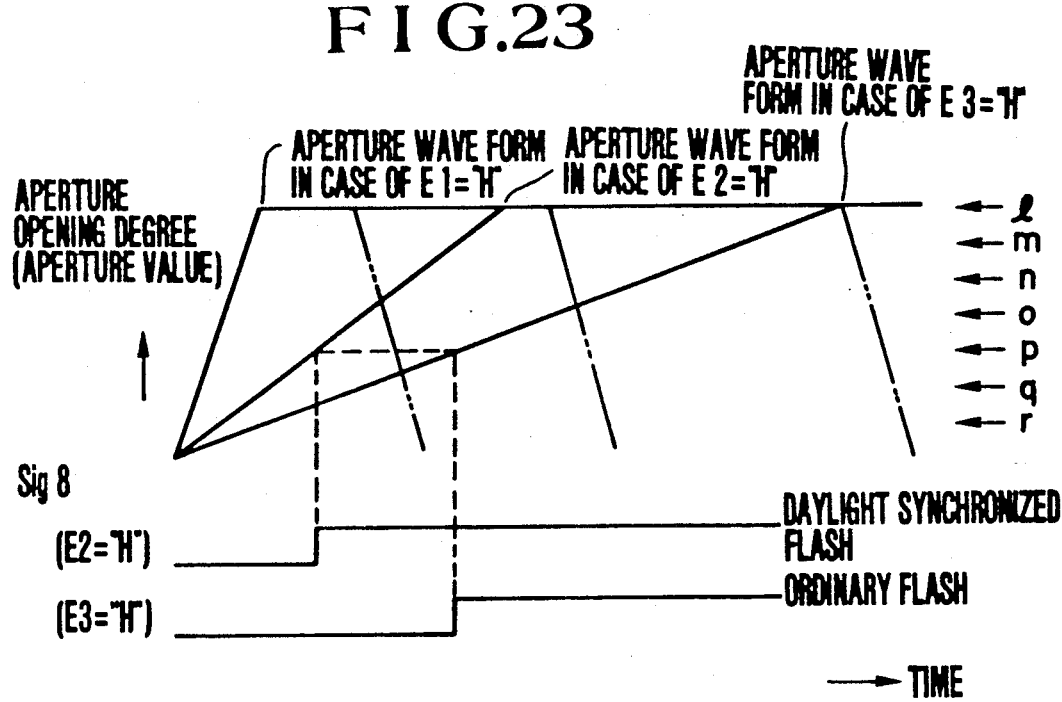

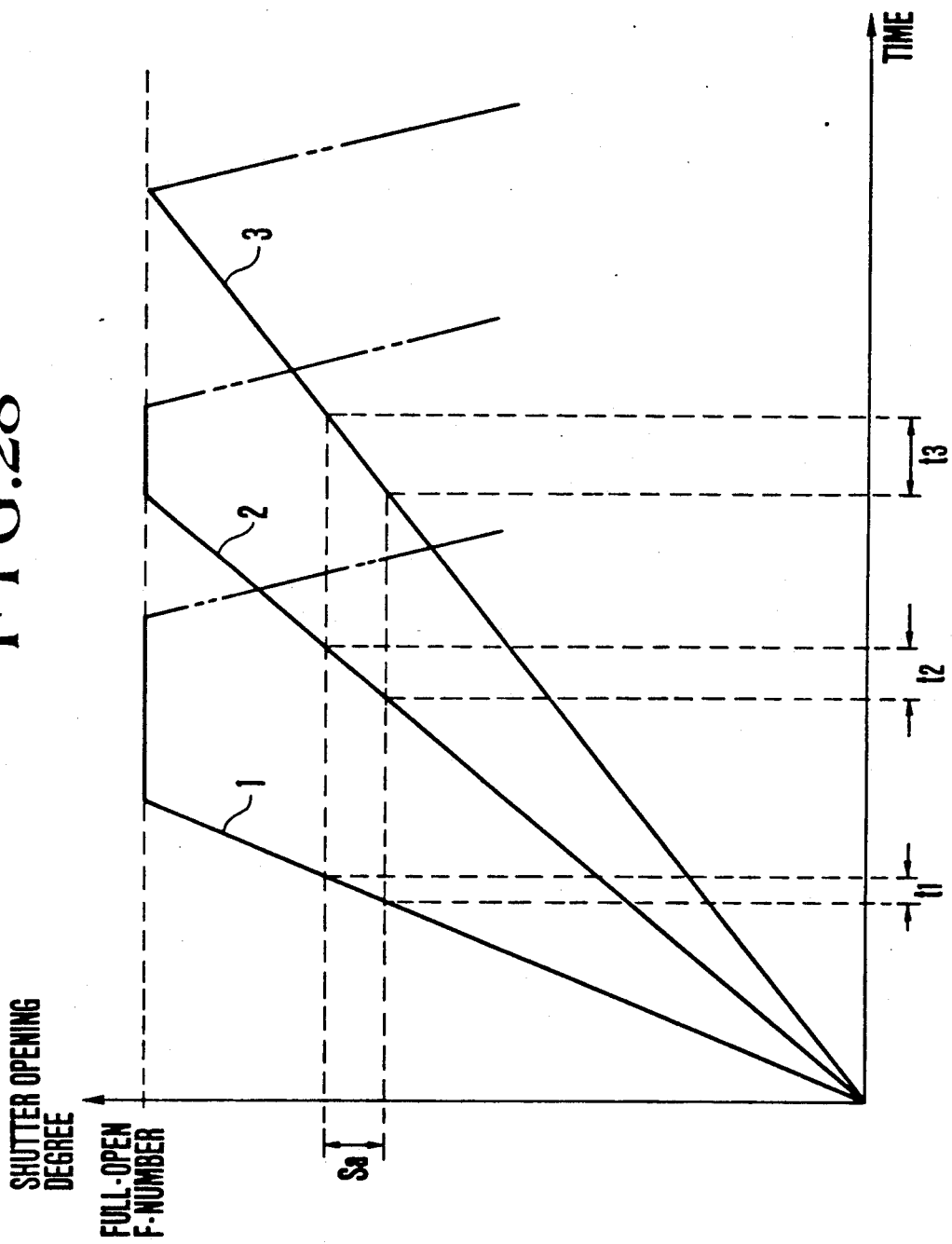

CAMERA

This is a continuation application of Ser. No. 07/434,606, filed Nov. 8, 1989, which in turn is a continuation application of Ser. No. 07/317,063, filed Feb. 28, 1989, which in turn is a continuation application of Ser. No. 07/191,797, filed May, 2, 1988, which in turn is a continuation application of Ser. No. 06/855,171, filed Apr. 22, 1986 all now abandoned.

BACKGROUND OF THE INVENTION

1. Field of the Invention

This invention relates to a camera having a shutter driving device which, upon receipt of electric energy, drives shutter blades to open, and more particularly to a camera which is arranged to vary the amount of electric energy supplied to the shutter driving device.

2. Description of the Prior Art

There are various known shutter devices including lens shutters or shutters of the kind arranged to function also as a stop. The shutter devices of this kind further include shutter devices of the type having a so-called low-speed half-opening region in which the shutter blades are arranged to open at a relatively low speed.

Generally, the shutter device of this type is arranged to include a mechanical governor in a shutter blade opening device for driving the shutter blades at a given speed and thus to stabilizing the quantity of light incident on an image plane. In actuality, however, the opening speed of the shutter varies with the posture of the camera and environmental conditions, such as ambient temperature, humidity, etc. Therefore, it has been difficult to ensure an apposite quantity of light on the image plane.

Meanwhile, Japanese Laid-Open Patent Application No. SHO 55-96925 discloses a camera which is arranged to change the opening speed of the shutter in such a way as to have the so-called program curve changeable according to the object to be photographed and photographing conditions. However, in this arrangement the opening speed of the shutter still varies with the environmental conditions such as the ambient temperature, etc. It has been hardly possible, therefore, to adequately change the program curve with such arrangement.

SUMMARY OF THE INVENTION

The present invention is directed to the solution of the above-stated problem of the prior art. It is therefore a first object of this invention to provide a camera which is capable of obtaining an apposite quantity of light and is free from any adverse effect of such environmental conditions, as a camera holding posture, temperature, humidity, etc., by improving the correlation between an electrical control system and a mechanical system including shutter blades to permit highly accurate control over the opening speed of the shutter blades which determines the quantity of light incident upon the image plane of the camera.

It is a second object of this invention to provide a camera which is capable of appositely selecting and controlling the opening speed of shutter blades to suit to each of different photographing objects such as a sport scene, a landscape, etc.

It is a third object of this invention to provide a camera which appositely controls the speed of shutter blades to stabilize an exposure and prevent the camera from taking a blurred picture due to hand vibrations.

It is a fourth object of this invention to provide a camera which facilitates design work on devices for obtaining an apposite quantity of light, excels in durability and permits reduction in cost.

To attain these objects, a camera according to this invention comprises shutter blades; driving means which, upon receipt of electric energy, opens the shutter blades; optical detecting means for optically detecting the operating state of the shutter blades; and a control circuit which controls the opening speed of the shutter blades by changing the amount of electric energy supplied to the driving means in response to the output of the optical detecting means. The above-stated driving means for causing the shutter blades to open may be a rotor, a plunger, a motor, an electric-to-mechanical converting element such as a piezo-electric element, etc. The driving means is arranged, for example, either to open the shutter blades with the rotating force of a rotor which is rotated by a Lorentz's force in a magnetic field developed when a conductor mounted thereon is energized or to open the shutter blades by making a linear motion. Unlike the conventional driving means having a governor device, the driving means of the subject invention gives varied opening speeds of the shutter blades, which are driven in association with each other. The optical detecting means which detects the operating state of the shutter blades may be arranged to detect the operating state of the shutter blades either directly, or indirectly through a moving member which moves in association with the shutter blades (as in the case of the rotor of the driving means mentioned above) In either way, the optical detecting means is arranged to be capable of producing detection signal following the actual movement of the shutter blades.

More specifically, the optical detecting means is arranged, for example, as follows A part of each of the shutter blades, or a moving member which moves in association with that part, is interposed in between a light projecting part and a light receiving part. These members, which move in association with each other, are arranged to repetitively bring about a light transmissible state, in which light from the light projecting part is allowed to reach the light receiving part, and a light blocking (or shielding) state, in accordance with the movement of the shutter blades. The control circuit, which controls the mount of electric energy supplied to the driving means by receiving the detection signal from the optical detecting means, is arranged as follows: The control circuit receives signals from distance measuring means, light measuring means, etc., as information on a photographing object (such as a sport mode, a landscape mode, etc.) and photographing conditions (such as a distance to the object, the level of the ambient light, the presence or absence of a rear light condition, use of a flash light device, etc.). Then, with the shutter blade opening speed either manually or automatically set at a given value according to this information, the control circuit forms a closed loop which controls the actual movement of the shutter blades so that it coincides with this set value of opening speed. A term "free setting of opening speed" which is used herein means that variations in the area of an aperture relative to the lapse of time can be set as desired and does not mean a simple setting action on the speed of shutter blades.

This invention is applicable to a shutter device arranged to perform combined functions as a shutter and as a stop. A typical example of this is a lens shutter or the like. The invention is also applicable to shutter devices of other kinds including a shutter device which is arranged separately from a stop or diagram device; a focal plane type shutter device having shutter blades; and a camera having an auxiliary stop. In any of these varied cases, the invention gives advantageous effects.

These and further objects and features of this invention will become apparent from the following detailed description of embodiments thereof taken in connection with the accompanying drawings.

BRIEF DESCRIPTION OF THE DRAWINGS

FIGS. 1 to 5 are perspective views showing in outline a series of movements of components of a driving device of a camera arranged as an embodiment of this invention, in which FIG. 1 shows the driving device in an initial state; FIG. 2 shows it in a focusing state; FIG. 3 shows it as in a state of effecting an exposure; FIG. 4 shows it as in a state of correcting the position of a lens barrel. FIG. 5 shows it as in a film winding state.

FIG. 8(a) is a flow chart showing a sequence of steps or states of operation of the driving device of FIG. 1, and FIG. 8(b) shows a micro-computer which controls the processes of the operation shown in FIG. 8(a), together with incoming and outgoing signals to and from the microcomputer.

FIG. 22 is a circuit diagram showing, by way of example, a flash device arranged for the rotor driving circuit of FIG. 20.

FIG. 23 is an illustration of a relation between an aperture opening degree and the timing for the flashing action of a flash device.

FIG. 24 is a chart showing by way of example, information on the results of distance measurements.

FIGS. 27(a), 27(b) and 27(c) are graphs showing variations in the opening area of the shutter blades.

FIG. 28 is a graph showing the advantageous effect attainable in accordance with this invention.

DESCRIPTION OF THE PREFERRED EMBODIMENTS

Figure 1:
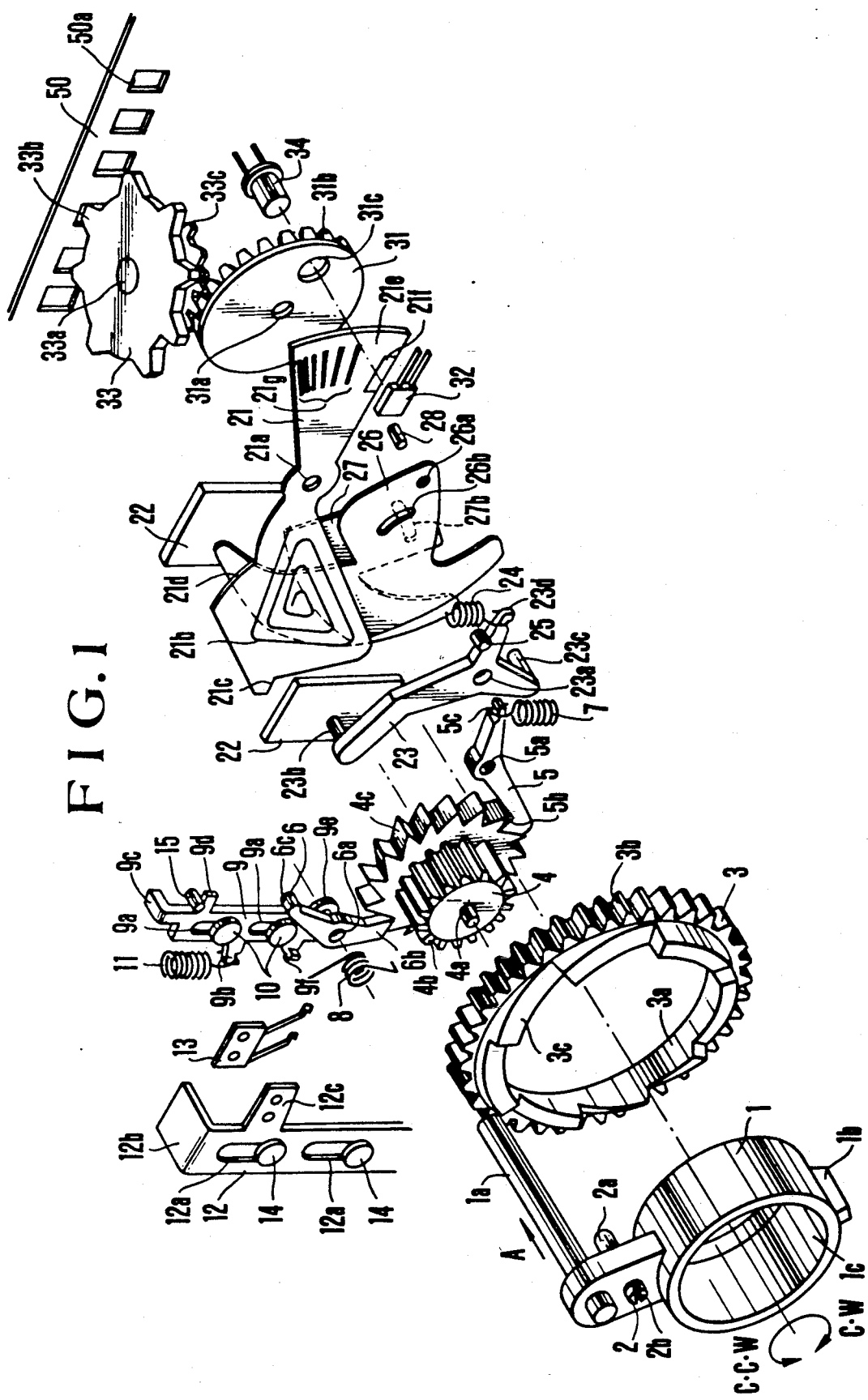
Figure 2:
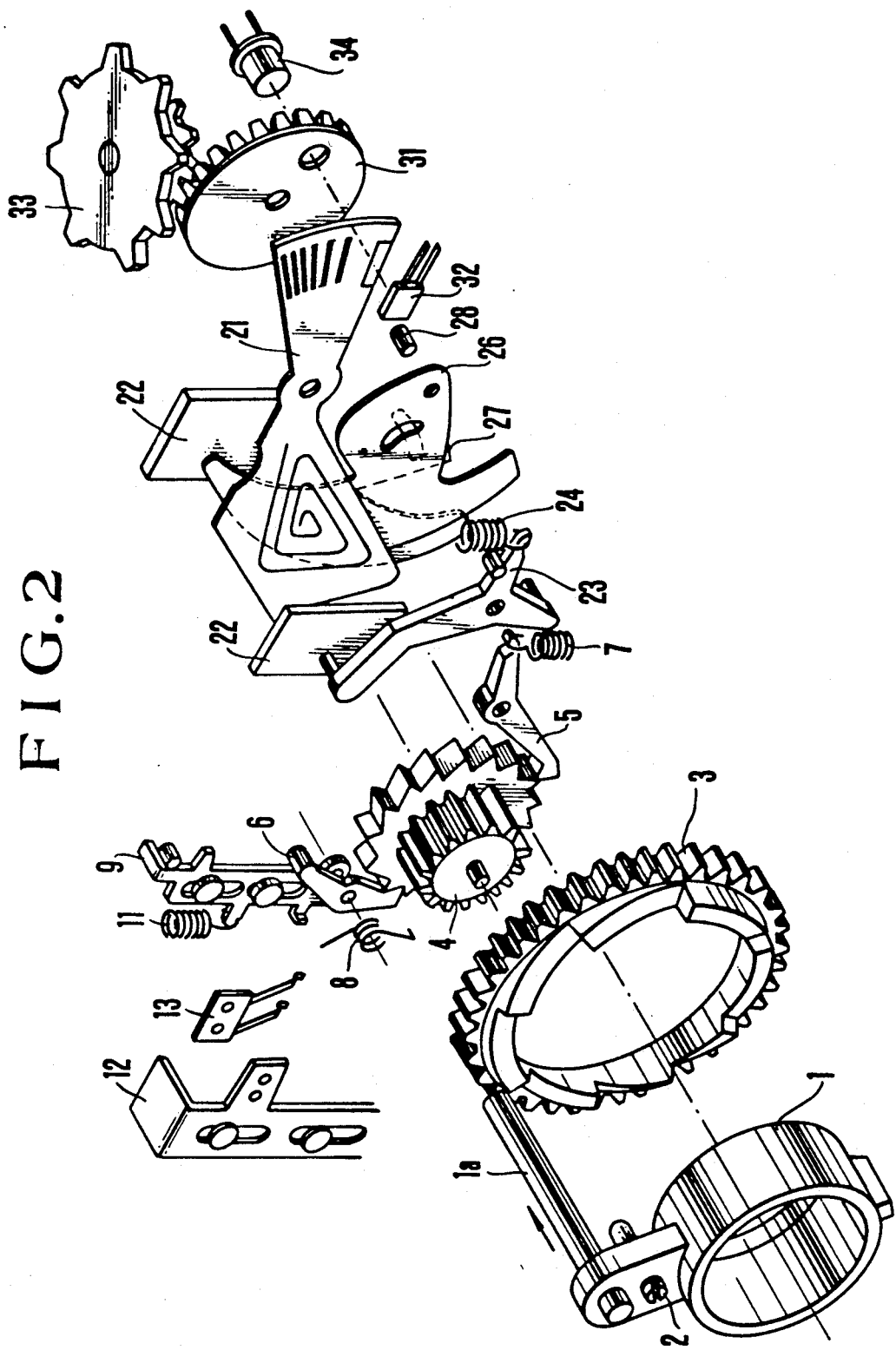

The following describes some preferred embodiments of this invention with reference to the accompanying drawings, wherein: FIGS. 1 to 5 show the internal structural arrangement of a camera embodying this invention. Referring to FIG. 1, a lens barrel 1 is provided with an inner diameter part 1c which contains therein a group of photo-taking lenses arranged in a known manner. A guide bar 1a, which is formed in one unified body with the lens barrel 1, engages with and is guided by a hole provided in a structural member (not shown). A spring (not shown) urges the guide bar 1a to move in the direction of arrow A. Meanwhile, a rotation stopping part 1b of the lens barrel 1 is slidably guided by a groove provided in a structural member not shown). The lens barrel 1 is thus arranged to be slidable to the right and left as viewed in the drawing without changing its position relative to the optical axis of the phototaking lens group.

A focus adjustment screw 2 is disposed close to the guide bar 1a in a self-tapping manner. The selftapping screw 2 is provided with a smooth ball-shaped fore end part 2a, which is caused by the force of a spring (not shown) exerted in the direction of arrow A to abut on a pushing cam 3c, which will be described later. The focus of the lens is adjustable by turning this screw 2 with a screw driver by inserting the driver into the slit part 2b of the screw. A distance ring 3 is provided with an inner diameter part 3a which is fitted on and is rotatably carried by a structural member (not shown). A gear 3b, which is formed on the periphery of the ring 3, engages a gear 4b of a ratchet ring 4, which will be described later. The ring 3 is provided further with the pushing cam 3c which are symmetrically formed in eight parts on the circumference of the cam 3. The ratchet ring 4 is provided with a shaft 4a which is rotatably carried by a structural member (not shown). The gear 4b and ratchet teeth 4c are formed on a peripheral part of the ring 4. A claw part 5b of a ratchet pawl 5 and a claw part 6b of a pushing pawl 6 are arranged to engage the ratchet teeth 4c.

The ratchet pawl 5 is provided with a hole 5a which is fitted on and rotatably carried by a shaft (not shown). A spring 7 is attached to one end of the pawl 5 and is arranged to exert an urging force on the pawl 5 urging it to turn clockwise (hereinafter referred to as the CW direction) as viewed in the drawing. Further, with the claw part 5b engaged with the periphery of the ratchet ring 4 as mentioned above, the ratchet ring 4 is turnable solely counterclockwise (hereinafter referred to as CCW direction) as viewed in the drawing.

The pushing pawl 6 is provided with a hole 6a. The hole 6a is fitted on a shaft which is not shown but is disposed on a pushing lever 9. The pushing pawl 6 is thus rotatably carried by the shaft. A spring 8, of a weak spring force, urges the pawl 6 to turn in the CCW direction as viewed in the drawing. This causes one end 6c of the pawl 6 to abut on one end, part of the pushing lever 9. With the pawl 6 thus kept in the condition as shown in FIG. 1, the claw part 6b engages the ratchet teeth 4c of the ratchet ring 4 as mentioned in the foregoing.

The pushing lever 9 is slidably carried by shafts 10 which are parts of a structural member and are arranged to engage the slots 9a of the lever 9 in such a way as to enable the lever 9 to move up and down as viewed in the drawing. A spring 11 urges the arm part 9b of the pushing lever 9 to move upward. Meanwhile, a stopper part 9d of the lever 9 abuts on a stopper 15 to keep the lever 9 in the condition as shown in FIG. 1. The pushing lever 9 is provided further with a seat 9e which has a shaft (not shown) attached thereto by caulking and arranged thereon to fit into the fitting hole 6a of the above-stated pushing pawl 6; a spring peg part 9f to which the above-stated spring 8 is attached at its one end; and another arm part 9c which is arranged to be hit by a hammer part 21c of a rotor 21. Under the condition of FIG. 1, a distance between the hammer part 21c of the rotor 21 and the arm part 9c of the lever 9 is close to zero. The parts mentioned above jointly form a focus adjusting device.

A release lever 12 has slots 12a fitted on structural members 14 and is thus arranged to be slidable up and down on the members 14. A spring (not shown) urges the lever 12 to move upward. The release lever 12 is provided with a connecting part 12b which is connected to the shutter release button of the camera. When the photographer performs a release operation on the camera with the camera directed to an object to be photographed, the connecting part 12b is pushed via the release button. Then, the release lever 12 is caused to slide downward against the urging force of the spring. The lever 12 is further provided with another connecting part 12c which is connected to a switch contact 13 for switching on the power supply of the camera. The camera is arranged to have current supplied to an IC of the camera when the release button is operated to the end of a first stroke and then to perform light measuring and distance measuring operations. The results of these operations are arranged to be displayed. When the release button is further operated to the end of a second stroke, a second switch is turned on by the contact 13 and a sequence of exposure effecting processes of the camera begins.

A printed board rotor 21 consists of operation and moving members which are formed in one body. A structural member not shown) is fitted in a hole 21a of the rotor 21 to rotatably carry the rotor 21. A coil-shaped conductive pattern 21b is depicted on one of the swinging arms of the rotor 21. This conductive pattern 21b is connected to a main circuit via lead wires (not shown). As will be described later in further detail, the main circuit is arranged to supply a current to the coil-shaped conductive pattern 21b in two directions. The coil-shaped conductive pattern 21b is interposed between yokes 22 and forms a magnetic circuit in conjunction with a permanent magnet which is not shown. The rotor is thus arranged to be rotatable in two directions by a Lorentz's force developed when current is supplied to the coil-shaped conductive pattern 21b. The rotating direction of the rotor varies with the direction in which the current is allowed to flow. Therefore, current direction change-over means, which is provided in a circuit as will be described later, causes the rotor 21 to be rotated either in the CW or CCW direction by a rotating force as viewed in the drawing.

The rotor 21 is provided with the hammer part 21c which is arranged to hit the arm part 9c of the pushing lever 9 when the rotor 21 turns in the CCW direction; and a cam part 21d which is arranged to push upward the pin 23b of a blade driving lever 23 when the rotor 21 turns in the CW direction. The rotor 21 is provided further with a transparent sector part 21e which is formed on the other swinging arm of the rotor 21. The transparent sector part 21e has opaque patterns 21g and 21f depicted thereon. A light emitting element 34 and a light receiving element 32 are disposed on opposite sides of the transparent part 21e which includes these opaque patterns 21g and 21f. These light emitting and receiving elements 34 and 32 are opposed to each other across the transparent part 21e to form a photo-interrupter (optical detecting means). Further, in between the transparent part 21e and the light emitting element 34, there is disposed a film winding indexing plate 31.

The blade driving lever 23 is pivotally carried by a structural member which is fitted into a hole 23a of the lever 23. A spring 24, which is attached to an arm 23d of the lever 23, urges the lever 23 in the CCW direction as viewed in the drawing. Under normal condition, the arm part 23d is abutting a stopper 25 to keep the blade driving lever 23 in the state as shown in the drawing. The lever 23 is provided with the pin 23b which abuts the cam part 21d of the rotor 21 when the rotor 21 is energized to turn in the CW direction. Then, the pin 23b causes the lever 23 to follow the rotation of the rotor 21. The lever 23 is provided further with a blade driving pin 23c which is fitted into slots 26b and 27b of shutter blades 26 and 27 and is thus arranged to drive these shutter blades when the lever 23 turns accordingly as the rotor rotates. Therefore, when a current is supplied to the rotor 21 to make it rotate in the CW direction, the cam part 21d of the rotor 21 abuts the pin 23b causing the blade driving lever 23 to rotate also in the CW direction. This causes the shutter blade 26 to turn in the CCW direction and the other shutter blade 27 to turn in the CW direction thereby opening the shutter. When the current or power supplied to the rotor 21 is cut off, the urging force of the spring, which is attached to the blade driving lever 23, turns the lever 23 backward in the CCW direction. The pin 23b this time pushes the cam part 21d of the rotor 21 and comes back to a point where the arm 23d of the level 23 abuts the stopper 25 while causing the rotor 21 to rotate in the CCW direction. As a result, the shutter is closed with the blades 26 and 27 thus brought back to their positions as shown in the drawing.

The shutter blades 26 and 27 have holes 26a and 27a (not shown) rotatably fitted on a pin 28 which is a structural member. Meanwhile, slots 26b and 27b are fitted on the blade driving pin 23c of the blade driving lever 23 and are thus arranged to open and close the shutter accordingly as the lever 23 rotates. These parts jointly form an exposure light quantity adjusting device.

The film winding indexing plate 31 is rotatably carried by a shaft which is not shown but is a structural member and is fittingly engaged with a hole 31a of the plate 31. The plate 31 is provided with a crown gear 31b which is formed on one peripheral side of the plate 31 and is arranged to engage a gear 33c of a sprocket 33. The indexing plate 31 is provided further with a hole 31c which is disposed in the optical path of the above-stated photo-interrupter (32 and 34). When the indexing plate 31 makes one turn, the hole 31c again enters the optical path of the photo-interrupter (32 and 34).

The sprocket 33 is rotatably carried at a hole 33a thereof. The sprocket 33 is provided with teeth 33b which are arranged to engage the perforations 50a of a film 50 and the gear 33c which is arranged to engage the crown gear 31b of the indexing plate 31. The sprocket 33 rotates in the CCW direction accordingly as the film 50 moves to the left as viewed in the drawing. Then, the indexing plate 31 rotates in the CW direction. When the film 50 moves to an extent of 8 perforations, the indexing plate 31 completes one turn and the hole 31c enters the optical path of the photo-interrupter (32 and 34). These parts form a film winding device. The film winding device is preferably arranged to have the sprocket rotate accordingly as the winding device operates even when the camera is not loaded with any film.

The light receiving element 32 and the light emitting element 34 are opposed to each other across the transparent part 21e of the rotor 21 and the indexing plate 31. The two elements 34 and 32 jointly form the photo-interrupter. As shown in FIG. 1, light flux emitted from the light emitting element 34 passes through the hole 31c of the indexing plate 31 and the transparent part 21e of the rotor 21 before it reaches the light receiving element 32. Then, a film feeding completion signal A8 is supplied to a circuit which will be described later. The light emitting element 34 is arranged to emit light only when the power supply is switched on. These parts jointly form a light signal detector.

The camera arranged in this manner operates as follows: After completion of a charging process as shown in FIG. 1, when the photographer pushes down the shutter release button with the camera directed toward an object to be photographed, the release lever 12 slides downward as viewed in the drawing. Then, the contact 13 turns on the power supply switch SWX supply power to the IC. The power supply is latched and a position confirming operation is first performed. In the position confirming operation, the light emitting element 34 is caused to emit light and it is confirmed that this light is received by the light receiving element 32. In other words, the film 50 is checked by this confirming operation to see if it is set in a correct position within the camera after film winding. In this instance, if the light received at the light receiving element 32 is less than a predetermined level, the camera is judged to be in an abnormal condition and subsequent processes are inhibited. In other words, there obtains a state S9 which will be described later.

If the result of the confirming operation is satisfactory, a current is supplied to the rotor 21 in the CW direction in a state S1 and the battery and the operation are checked. This supply of power is effected only for a short period of time. The rotor 21 turns in the CW direction as viewed in the drawing. The power supply is cut off when the first pattern of the opaque pattern part 21g enters the optical path of the photo-interrupter. Therefore, the shutter blades do not open.

When the battery has been found to have a sufficient voltage level through the battery check process, the camera takes a next state S2, at which a distance measuring operation is performed. This distance measuring operation is preferably carried out by a combination of a diode which emits an infrared light and a light receiving element such as a PSD. Further, at about the same time as the distance measuring operation, a normal preliminary light measuring operation is performed. Upon completion of these two measuring operations, the results of the two are displayed within a view finder. The camera then enters to a state S3.

When the photographer pushes the release lever 12 further downward via the release button (a second stroke), the switch contact is connected to the next conductive pattern to bring the camera into a state S4 in which the photographing operation begins as follows: A driving power supply of the camera is first latched. At the same time, a pulse power supply is repeated to cause the rotor 21 to turn in the CCW direction from the stationary state of FIG. 1 for a number of times determined on the basis of the result of the above-stated distance measurement. When the rotor 21 turns in the CCW direction, the hammer part 21c hits the pushing lever 9 on its arm part 9c. The pushing lever 9 is then moved downward against the urging force of the spring 11 causing, via the pushing pawl 6, the ratchet ring 4 to turn to a degree corresponding to one ratchet tooth 4c in the CCW direction as viewed in the drawing. Then, the distance ring 3, which engages the ring 4, turns in the CW direction. The rotation of the ratchet ring 4 in the CCW direction pushes the ratchet pawl 5 along the slanting face of one of the teeth 4c to cause the pawl 5 to move in the CCW direction. The pawl 5 is thus caused to ride one tooth 4c of the ratchet ring 4. The pawl 5 then resumes its position to prevent the rotation of the ratchet ring 4 in the CW direction.

After this, when the power supplied to the rotor 21 is cut off, the rotor 21 comes back to its initial position as shown in FIG. 1. The force of the spring 11 brings the pushing lever 9 back to its position of FIG. 1. Then, since the ratchet ring 4 is prevented by the ratchet pawl 5 from rotating in the CW direction, the pushing lever 9 rides the slanting face of the ratchet teeth 4c of the ratchet ring 4 (swinging in the CW direction) and thus comes back to its state as shown in FIG. 1.

The optical path of the photo-interrupter (32 and 34) is blocked by the opaque pattern 21f when the rotor 21 rotates in the CCW direction. The IC then detects, through the distance ring 3, that the lens barrel 1 is moved forward to an extent corresponding to one ratchet tooth 4c. The IC compares this with a lens shifting signal which is stored as a result of the above-stated distance measuring operation. The operation of the camera then proceeds to a next process. The lens barrel 1 is thus drawn forward to the extent of one ratchet tooth 4c at a time until the lens is shifted to a position coincident with the value which is determined on the basis of the result of the distance measurement. In other words, a signal from the photo-interrupter is detected repeatedly until it comes to coincide with the lens shifting signal obtained as a result of the above-stated distance measurement. After that, a lens barrel driving completion signal A5 is generated.

Following this, the camera assumes a state 85. A current is supplied to the rotor 21 in the direction of causing the rotor to turn in the CW direction which is reverse to the lens barrel driving direction. The cam part 21d pushes the pin 23b of the blade driving lever 23. This causes the lever 23 to turn against the force of the spring 24 along the face of the cam part 21d in the CW direction. The pin 23c then opens the blades 26 and 27 to bring them into a state as shown in FIG. 3.

During the blade opening process, before the blades 26 and 27 open, a first of the opaque patterns 21g of the rotor 21 enters the optical path of the photointerrupter (32 and 34) to supply a shutter circuit with a timing signal for opening the shutter blades. The opaque patterns 21g of the rotor 21 then come to block the optical path of the photo-interrupter one after another. By this, a signal is produced to inform the above-stated IC of the opening degree and the opening speed of the shutter blades 26 and 27. The opened shape of the blades is arranged to be variable by changing the value of the current to be supplied to the rotor 21 through a switching operation performed on the basis of a change-over operation applied from outside beforehand. It is also possible to stop the shutter blades 26 and 27 at a predetermined opening position with the current flowing to the rotor 21 controlled by comparing the signal of the photo-interrupter with time.

With the shutter opened in the above-stated manner, light measuring means which is not shown produces a shutter closing signal (or an exposure completion signal). In response to this signal, the power supply to the rotor is cut off. The urging force of the spring 24 which is exerted on the blade driving lever 23 brings the rotor 21 back to the stationary state of FIG. 1.

Next, the camera enters a state S6. The rotor 21 receives a pluse supply corresponding to a remaining number of ratchet teeth 4c represented by the lens shifting signal produced according to a distance measurement signal obtained during the above-stated distance measuring operation. Then, in the same manner as in the above-stated distance adjustment, the ratchet ring 4 is turned to bring the part of the lens barrel 1 contacting with the focus adjustment screw 2 to a next cam starting position of the distance ring 3 as shown in FIG. 4.

Upon completion of the operation of cancelling the remainder of distance adjustment mentioned above, a logic control IC produces a lens barrel driving completion signal A7. The camera enters a state S7. A film winding start signal is produced. A winding device, which includes a motor and is disposed within the camera, begins to perform a film winding action. The sprocket 33, which engages the perforation of the film 50, turns the indexing plate 31 from its stationary state. The hole 31c moves away from the optical path of the photointerrupter (32 and 34). The light receiving element 32 produces a winding start signal. Then, the film winding action is performed as shown in FIG. 5. When one frame portion of the film 50 is fed, the charge or indexing plate 31 comes back to its stationary state after completing one turn. The hole 31c of the plate 31 again enters the optical path of the photo-interrupter (32 and 34). A winding completion signal A8 is produced. The IC brings the winding action of the camera to a stop. The camera resumes the state of FIG. 1.

Figure 6A:
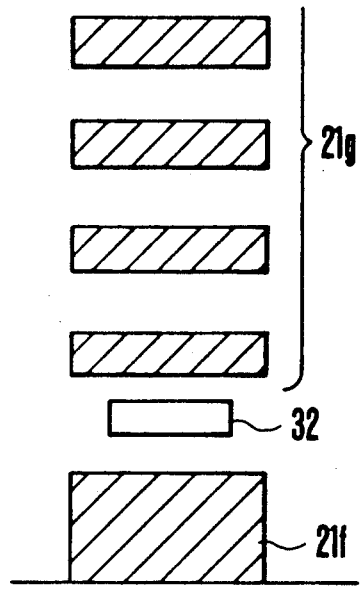
FIGS. 6(a) and 6(b) respectively, show the arrangement of a member for performing an on-and-off operation on light transmission through a moving member (a rotor).
Figure 6B:
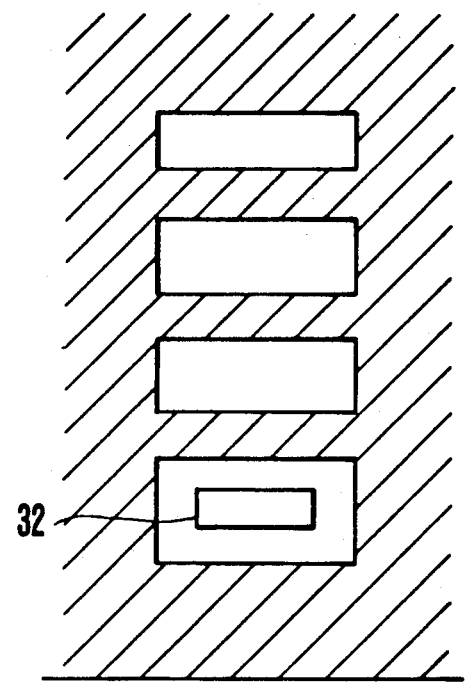

FIG. 6(a) is an enlarged view of the opaque patterns 21f and 21g. In this specific embodiment, each of these patterns 21f and 21g is arranged to have a wider area than the area of the above-stated light receiving element 32. FIG. 6(b) shows another example of the arrangement of the photo-interrupter. In this instance, holes are arranged to serve as light transmitting parts while the opaque part is formed as a frame part made of an epoxy resin material which contains glass fiber and is employed as the material used for forming the rotor 21.

Further, in the case of the specific embodiment described, the photo-interrupter is arranged to have a signal light come to the light receiving element when a projected light flux passes through an interposed member. However, this arrangement may be of course replaced with a different arrangement in which the light receiving element receives a signal light with the projected light allowed to be reflected as shown in FIG. 7(b).

Figure 7A:
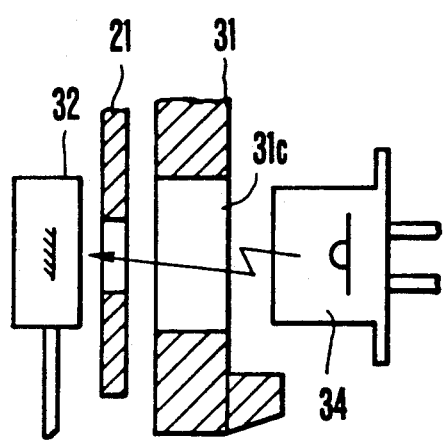
FIGS. 7(a) and 7(b) are schematic illustrations showing examples of a light signal detector, respectively.
Figure 7B:
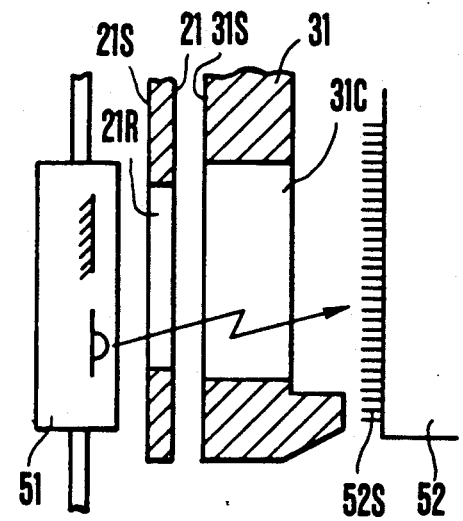

FIG. 7(a) is a sectional view of the photointerrupter of this embodiment. FIG. 7(b) is a sectional view of the above-stated modification of the photointerrupter arrangement (the photo-interrupter of the reflection type). Referring to FIG. 7(b), a reference numeral 51 denotes the photo-interrupter of the reflection type. The light emitting and receiving elements are placed within one package. A rotor 21 is provided with a hole 21R which is arranged in the same manner as in the case of the above-stated embodiment. Meanwhile, a left side face 21S is coated by vapor deposition with a high reflection film with the exception of the hole. A crown gear 31 is also arranged to have its left side face coated with a high reflection film which is applied by vapor deposition. A structural member 52 is provided with a flocked face 52S on the left side thereof as viewed on the drawing. Under the condition as shown in FIG. 7(b), the light emitted from the photo-interrupter 51 is almost completely absorbed by the flocked face 52S and does not reflect back to the photo-interrupter 51. The photo-interrupter 51 of the reflection type is also usable in combination with the embodiment described.

Some examples of circuit arrangement for controlling the above-stated mechanisms are as follows: FIG. 8(a) is a block diagram showing the states of operation of the camera embodying this invention. This invention is highly suited for the control operation of the so-called check-and-go method. Each process of operation from one state to another is carried out by checking a signal. These states of operation include:

S0: An initial stabilized state
S1: Self-functional check
S2: Distance measurement
S3: Waiting for release
S4: Driving the lens barrel
S5: An exposure
S6: Correction of lens barrel position
S7: Film feeding and resetting mechanical parts
S8: End of the operation
S9: Operation brought to a stop.

The operation is performed from one state to another by checking signals A1 to A8. In the event that the signals A1 to A8 are not generated due to some abnormality of operation, the operating state is shifted to a state S9 according to the signals representing lengths of time T1 to T7 of timers provided, respectively, for these states. With the operation shifted to the state S9, the camera is stopped from operating to inform the camera operator of the abnormality.

Figure 9:
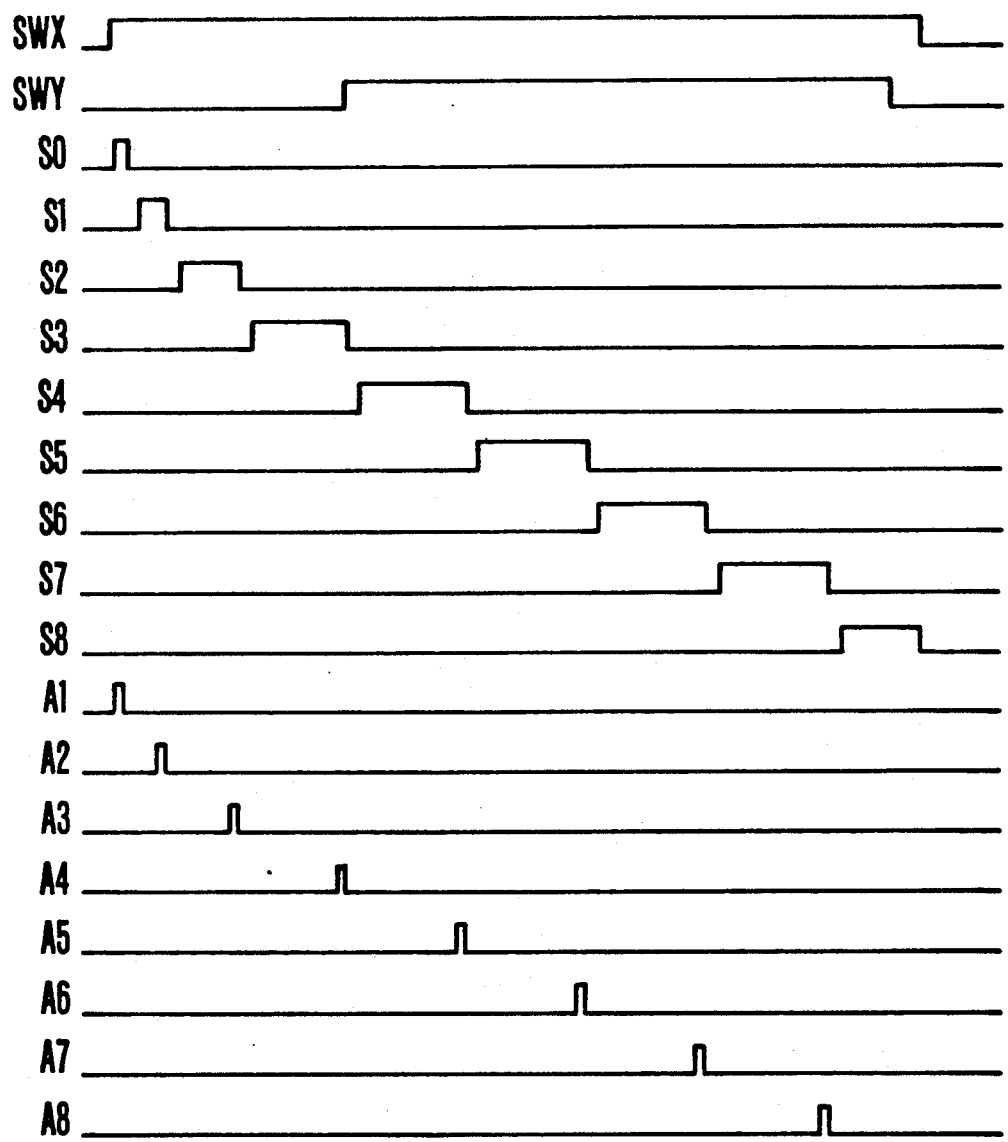
FIG. 9 is a time chart showing the stepwise processes of operation shown in FIG. 8.

FIG. 9 is a time chart showing the above-stated operation. Further, the level of each of the signals S0 to S7 becomes high when there obtains the applicable state represented by the signal. When the switch member 13 (SWX), which is interlocked with the release lever 12, turns on, there obtains the state S0. Then, when a time lapse signal A1 is generated in the state S0, the operation shifts to the state S1. In the state S1, the condition of the power supply V+ and the operation of the rotor 21 are checked. If they are found to be normal, a function normal signal A2 is produced and the operation of the camera shifts to the state S2. In the state S2, a distance to the object is measured. Upon completion of the distance measurement, a distance measurement completion signal A3 is generated and the operation shifts to the state S3. In the state S3, the camera awaits a release signal A4 which is to be generated by the intention of the photographer and is ready for actual photographing. Upon generation of the release signal A4, the operation enters the state S4. In the step S4, the lens barrel is shifted to an apposite position determined on the basis of distance measurement information obtained in the state S2 for photographing preparation. When a lens barrel driving completion signal A5 is generated, the operation enters the state S5. In the state S5, the film is exposed to light. When an exposure completion signal A6 is generated, the operation comes to the state S6. In the state S6, the position of the lens barrel is corrected or adjusted for a next photographing process by shifting it from the position set according to the distance measurement information in the state S4 to a position where it can be readily set into an initial position. When a lens barrel position adjustment completion signal A7 is generated, the operation comes to the state S7. In the state S7, a film feeding action for next photographing and an initial setting action on mechanical parts to be charged with energy for next photographing are accomplished. Upon completion of the film feeding and the initial setting action, a film feeding completion signal A8 is generated. The operation enters the state S8 and then comes to an end.

The process control over the varied states as shown in FIGS. 8(a) and 9 is accomplished according to state indicating signals S0 to S7 which are produced from a microcomputer M on the basis of condition signals including the signals A1 to A8 and signals T1 to T7 as shown in FIG. 8(b).

Figure 10:
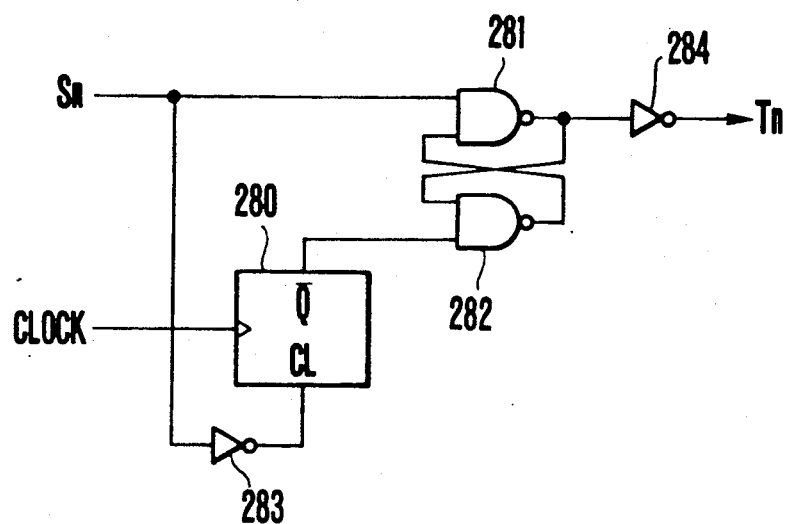
FIG. 10 is a circuit diagram showing, by way of example, the arrangement of a timer circuit.

FIG. 10 shows an example of a timer circuit which is arranged to shift the operation to the operation stopping mode of the state S9 in the event that a desired process is not accomplished within a given period of time in any of the states S1 to S7 due to some abnormality. In the case of this example, when the level of an input signal Sn (S2 for example) becomes high (hereinafter referred to as H) the output level of an inverter 283 changes from an H level to a low (hereinafter referred to as L) level. Then, a counter 280 counts clock pulses received at its clock input terminal. Upon completion of counting a given number of pulses, the counter 280 produces an L level signal from its $\overline{Q}$ output terminal. A latch circuit is formed by NAND gates 281 and 282. One of the inputs (the signal Sn) of the gate 281 is at an H level while one of the inputs of the other gate 282 is at an L level. When the levels of the two inputs of the gate 281 become H, the output of the gate 281 is latched at an L level. Then, the level of the output Tn (T2 for example) of an inverter 284 which receives the L level output of the gate 281 becomes H. This brings the state Sn into the state S9. A period of time after the state Sn becomes an H level and before the output Tn becomes the H level is arranged to be sufficiently longer than a period of time required for a normal process under the condition of the output Tn, so that the operation can be allowed to shift to the state S9 only in the event of an abnormality.

Figure 11:
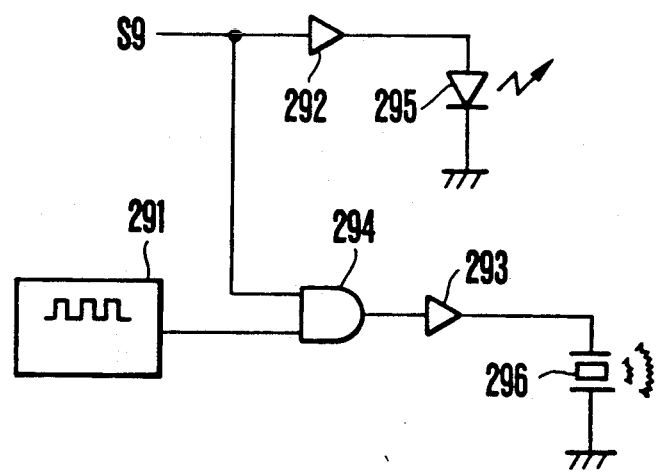
FIG. 11 is a circuit diagram showing, by way of example, the arrangement of an abnormality warning circuit.

FIG. 11 shows an example of an abnormality warning circuit which is arranged to inform the photographer of an abnormality in the event of occurrence of a shift of the operation to the operation stopping state S9. When the level of the state signal S9 becomes an H level, a buffer 292 causes a current to flow to an LED 295. The LED 295 then lights up. Meanwhile, an oscillation signal is supplied from an oscillator 291 to one of the input terminals of an AND gate 294 while an H level signal is supplied to the other input terminal of the AND gate. The AND gate 294 produces a signal which alternates between an H level and an L level. As a result, another buffer 293 supplies an alternating current to a sound producing element 296 such as a ceramic oscillator. A sound is thus produced to inform the photographer of the abnormality.

Figure 12:
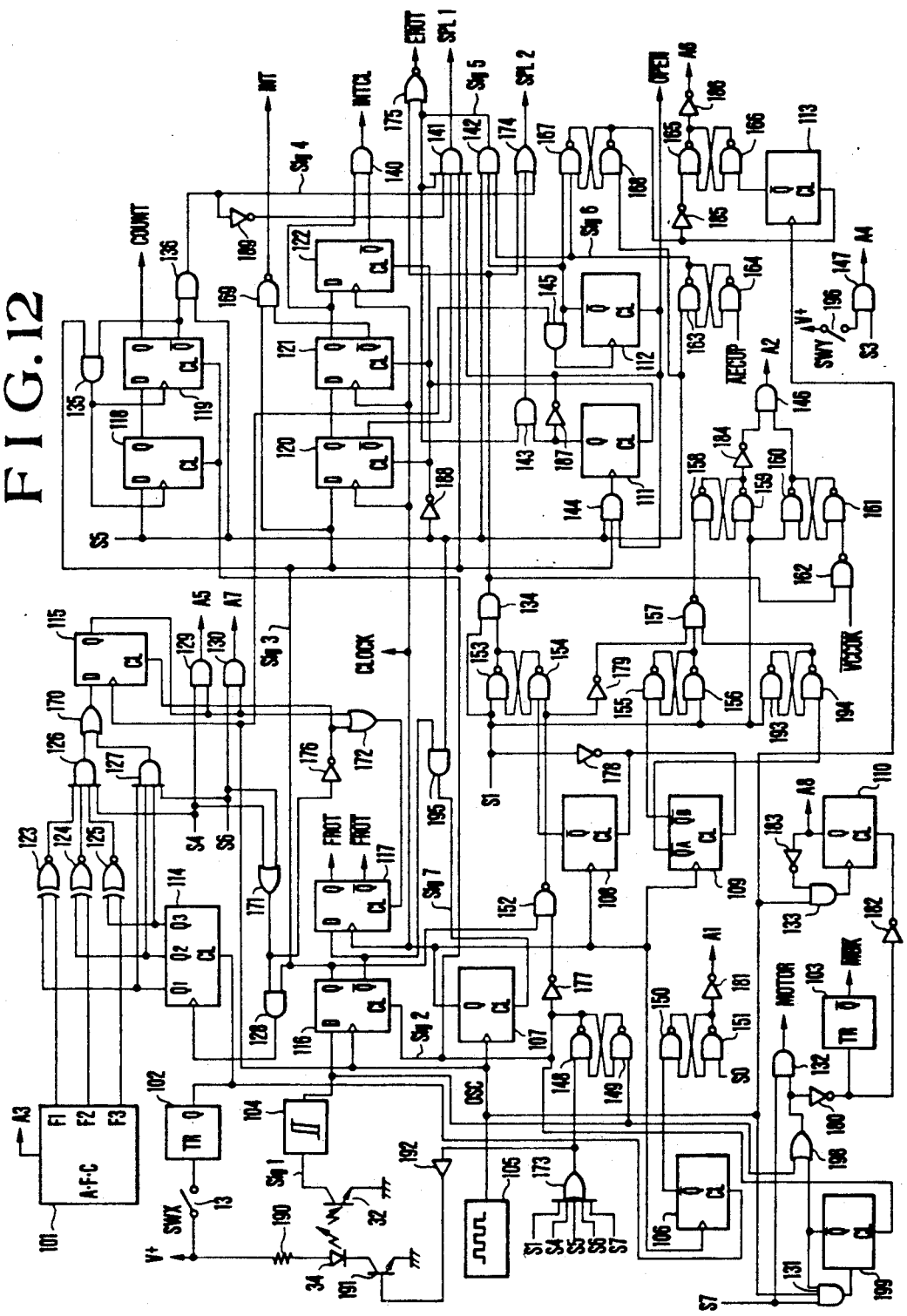
FIG. 12 is a circuit diagram showing, by way of example, the arrangement of a control circuit which provides the driving device of FIG. 1 with a sequence of the operating procedures of the camera.

FIG. 12 shows, by way of example, the details of a control circuit required for the operation in each of the states S0 to S7. For each of these states, the control circuit operates in the following manner:

Initial stability - State S0

When the switch 13 (or SWX) which is interlocked with the release lever 12 turns on, an H level signal is applied to the trigger input terminal of a monostable multivibrator (hereinafter referred to as MM for short) 102. The MM 102 then produces a pulse signal which remains at an H level for a given period of time. The H level pulse signal is supplied to the input terminal CL of a counter 106. The counter 106 produces an H level output from its $\overline{Q}$ output terminal. NAND gates 150 and 151 form a latch circuit. The output level of the gate 151 becomes H when the signal S0 is at an L level. Then, the output of an inverter 181, which is the signal A1, is at an L level. The pulse width of the signal S0 is arranged such that, when the level of the signal S0 changes from the L level to an H level, the level of the Q output of the MM 102 changes from an H level to an L level and the level of the input to the input terminal CL of the counter 106 changes from an H level to an L level. Then, the counter 106 begins to count the clock pulses of an oscillator 105 which are frequency divided by a frequency divider 107. When a given number of pulses have been counted, the $\overline{Q}$ output level of the counter 106 changes from H to L. In this instance, the level of one of the inputs of the NAND gate 150 is L and one input of the other NAND gate 151, which is the signal S0, is at an H level. Therefore, the output level of the gate 151 changes from H to L. The level of the output signal A1 of the inverter 181 then changes from an L level to an H level. The operation then shifts from the state S0 to the state S1. The level of the signal S0 becomes L and the output level of the gate 151 changes to an H level. Accordingly, the output, i.e. the signal A1, of the inverter 181 changes from an H level to an L level.

Self-functional check - State S1

When there obtains the state S1 and the level of the signal S1 becomes the L level, the output level of an OR gate 173 becomes H. A buffer circuit 192 allows a current to flow to the base of an NPN transistor 191. The NPN transistor 191 turns on. As a result, a current, which is limited by a resistor 190, flows to an LED 34 causing it to emit a light. At this time, the abovestated rotor 21 is in a position to allow the light emitted by the LED 34 to pass through the transparent part 21e and to irradiate a photo transistor 32. A collector signal Sig 1 of the transistor 32 thus changes from an H level to an L level. The signal is shaped by a shaping circuit 104 and is then supplied to one input terminal of a NAND gate 149. The output level of the NAND gate 149 becomes H. Another NAND gate 148 then has its two inputs at H levels. As a result, the output of the NAND gate 148 is latched at an L level. Then, a D flip-flop 116 is released from its cleared state. However, since the level of its D input is at an L level, the Q output and $\overline{Q}$ output of the D flip-flop 116 remain at an L level and an H level, respectively. Meanwhile, the signal S1 is supplied to one of the input terminals of a NAND gate 153 to change the output level of the NAND gate 153 from an L level to an H level. Therefore, both the output of a NAND gate 152 and the $\overline{Q}$ output of a counter 108 are at H levels. The output of the NAND gate 153 is latched at the H level. The output level of an AND gate 134 becomes H. The output level of an OR gate 174, i.e. the level of a signal SPL 2, becomes H. The level of the output signal $\overline{EROT}$ of a NOR gate 175 becomes L. The output level of an inverter 178 becomes L. Therefore, counters 108 and 109 are released from their cleared states. Both of these counters 108 and 109 then begin to count clock pulses produced from the Q output terminal of a frequency divider 107.

Figure 13:
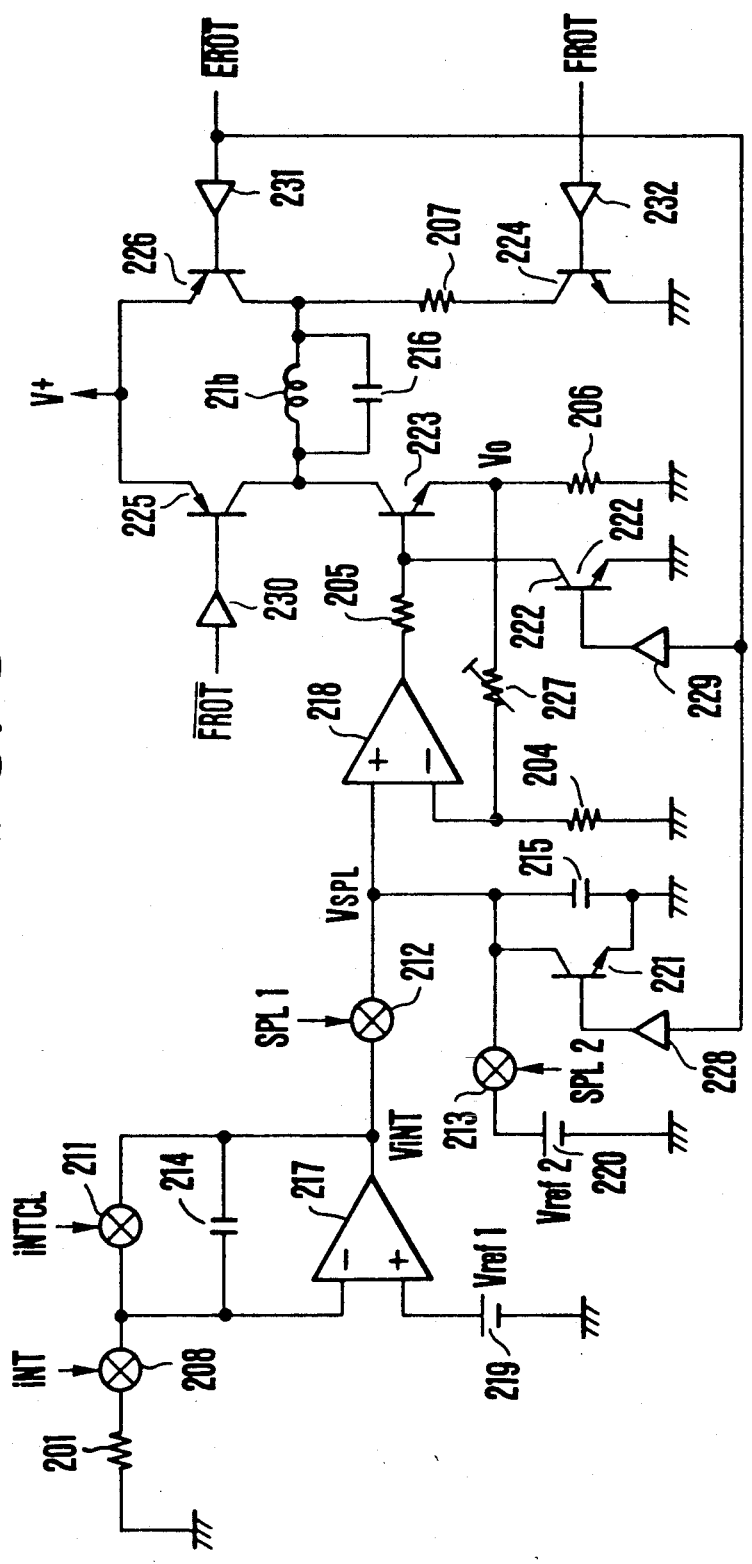
FIG. 13 is a circuit diagram showing, by way of example, the arrangement of a rotor driving circuit.

FIG. 13 shows, by way of example, the details of a driving circuit which is arranged to drive the conductive part 21b of the above-stated rotor 21. When the level of the signal SPL 2 becomes H, an analog switch 213 becomes conductive. The potential VSPL at the noninverting input terminal of an operational amplifier 218 then becomes equal to the potential Vref 2 of a reference voltage source 220. Meanwhile, when the level of the signal $\overline{EROT}$ becomes L, it causes a PNP transistor 226 to turn on via a buffer circuit 231 and also causes NPN transistors 221 and 222 to turn off via buffer circuits 228 and 229, respectively. Therefore, an NPN transistor 223 is rendered operative by the output of the operational amplifier 218 through a resistor 205. The emitter potential V0 thereof then becomes a value determined by a resistance ratio between a resistor 204 and a variable resistor 227 and the potential VSPL. If the value hfe of the NPN transistor 223 is sufficiently high, the collector current of the NPN transistor becomes a value obtained by dividing the potential V0 by the resistance value of a resistor 206. As a result, a current flows to the conductive part 21b. Then, the rotor 21 turns on the hole 21a in the CW direction as viewed in FIG. 1. When the rotor 21 turns a given degree of angle, the light incident on the photo transistor 32 is blocked by the first light blocking part of the opaque part 21g. The output level of the shaping circuit 104 then changes from an L level to an H level. Then, in synchronism with the rise of the clock pulse signal OSC of the oscillator 105, the level of the Q output of the D flip-flop 116 changes from an L level to an H level. Since the input of the inverter 177 is at an L level, the output of the inverter is at an H level. The NAND gate 152 thus has both inputs thereof at H levels. The output level of the NAND gate 152 thus becomes L. The output level of the inverter 179 becomes H. Meanwhile, the instant the level of the signal S1 becomes H, the counter 109 begins to count the clock pulses CLOCK. The counter 109 is arranged to have predetermined count numbers QA and QB (QA<QB). The level of the $\overline{QA}$ output of the counter 109 first changes from an H level to an L level. The output level of the NAND gate 194 then becomes H. The NAND gate 193 comes to have both inputs thereof at H levels and thus produces its output at an L level. The output of the NAND gate 194 is latched at an H level. Following this, when the level of the $\overline{QB}$ output of the counter 109 changes from an H level to an L level, the output of the NAND gate 156 changes from an H level to an L level and is latched at the L level. Therefore, when the output level of the inverter 179 becomes H within a period of time determined by the outputs $\overline{QA}$ and $\overline{QB}$ of the counter 109, the output level of the NAND gate 157 becomes L, that of the NAND gate 158 becomes H and that of the NAND gate 159 becomes L and they are latched at these levels. Then, the output level of the inverter 184 becomes H. In case that the output of the inverter 179 remains at an L level during the above-stated predetermined period of time, the output of the inverter 184 remains at an L level. In other words, in case that the shutter blade opening speed is not within an apposite speed range, the signal A2 is not produced warning the photographer of an abnormal condition.

Figure 15:
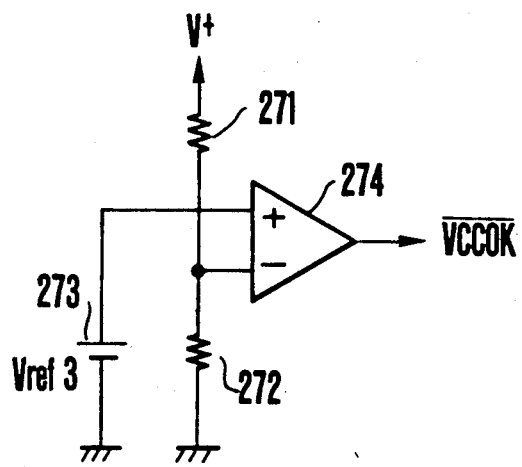
FIG. 15 is a circuit diagram showing an example of a power supply check circuit.

Meanwhile, another counter 108 also has the level of its $\overline{Q}$ output change from an H level to an L level within a predetermined period of time. The output of the NAND gate 153 changes from an H level to an L level and is latched at the L level. This causes the output level of the AND gate 134 to change from an H level to an L level. When the output level of the NAND gate 152 becomes an L level before the lapse of the given period of time determined by the counter 108, the output level of the AND gate 134 also changes from the H level to the L level. During these processes, the power supply voltage V+ is checked, for example, by a circuit arranged as shown in FIG. 15. Referring to FIG. 15, the voltage V+ is divided by resistors 271 and 272. A potential thus obtained is compared with the potential Vref 3 of a reference voltage source 273. The level of the output $\overline{VCCOK}$ of a comparator 274 becomes L if the former is higher than Vref 3 and H if the former is lower. If the signal $\overline{VCCOK}$ is at an L level, the output of the NAND gate 162 of FIG. 12 is at an H level. Therefore, in that instance, the output of the NAND gate 160 of FIG. 12 remains at an H level. In the operation described above, if the output of the inverter 184 is at an H level, the level of the output of the AND gate 146 which is the function-normal signal A2 is at an H level. The operation then shifts from the state S1 to the state S2. In case that the signal $\overline{VCCOK}$ is at an H level, the output level of the NAND gate 162 becomes L for the given period of time during which the AND gate 134 produces an H level output. The output of the NAND gate 160 is latched at an L level. The signal A2 remains at an L level.

If the level of the signal A2 does not become H, the circuit arrangement of FIG. 10 causes the level of the time lapse signal T2 to become H in the state S1. This shifts the operation from the state S1 to the state S9 to warn the photographer of an abnormality.

Further, when the output level of the AND gate 134 changes from an H level to an L level, the level of the output signal SPL 2 of the OR gate 174 becomes an L level. Then, the analog switch 213 of FIG. 13 becomes nonconductive. The level of the output signal $\overline{EROT}$ of the NOR gate 175 becomes H. The PNP transistor 226 turns off. The NPN transistors 222 and 221 turn on. The base current of the NPN transistor 223 is cut off. The potential VSPL drops to a level close to the ground potential GND. Accordingly, the current supplied to the conductive part 21b is cut off.

Lens barrel driving - State S4; and Lens barrel position correction - State 6

Figure 17:
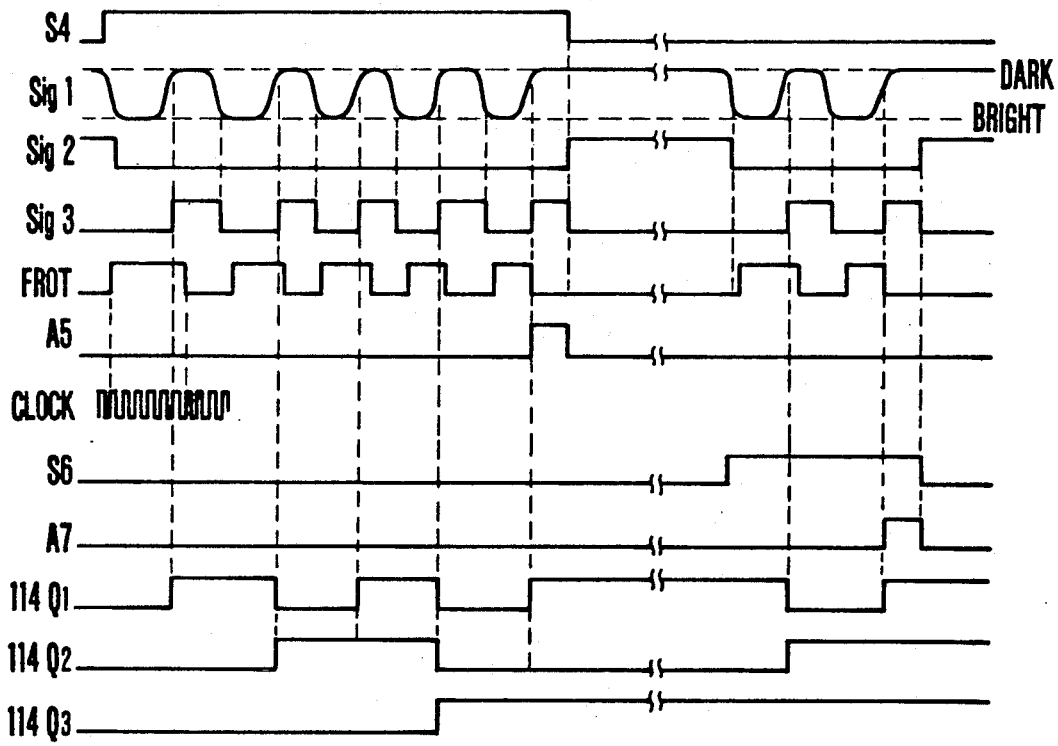
FIG. 17 is a timing chart showing a driving operation on the lens barrel.

When the level of the signal S4 changes from an L level to an H level, the output of the OR gate 171 changes from an L level to an H level. The output level of the inverter 176 changes from H to L. The D flip-flop 115 is released from a cleared state. The binary counter 114 turns on the switch member 13 (SWX) which is interlocked with the release lever 12. The counter 114 has already been cleared when an H level pulse is produced at the Q output terminal of the MM 102. The outputs Q1 to Q3 of the counter 114 are at L levels. If any one of the signals F1, F2 and F3 from the distance measuring circuit 101 is at an H level, the output of at least one of exclusive NOR gates 123, 124 and 125 is at an L level. Therefore, the output of the AND gate 126 is at an L level. Further, since the output of the AND gate 127 is surely at an L level, the output of an OR gate 170 is also at an L level. The Q output of the D flip-flop 115 is also at an L level. Therefore, both inputs of an OR gate 172 are at L levels. Thus a D flip-flop 117 is released from a cleared state. Meanwhile, the output level of the OR gate 173 also changes from an L level to an H level. The buffer circuit 192 causes the NPN transistor 191 to turn on. Therefore, the LED 34 emits a light. Then, the light passes through the transparent part 21e of the rotor 21 and comes to the photo transistor 32. The level of the collector signal Sig 1 of this photo transistor 32 changes from an H level to an L level. The rest of the operation is as described below with reference to the timing chart of FIG. 17, which shows the operation on the assumption that the distance measurement signal F1=H; signal F2=L and signal F3=H:

The collector signal Sig 1 of the photo transistor 32 is shaped by the shaping circuit 104 and is then supplied to the NAND gate 149. One input of another NAND gate 148 is the output of the OR gate 173 which is at an H level. Therefore, the output of the NAND gate 148, which is a signal Sig 2, is latched at an L level. Then, the D flip-flop 116 is released from a cleared state. However, since the D input of the flip-flop 116 is at an L level, the Q output, which is taken in at the rise of the clock pulse of the oscillator 105, is at an L level and the $\bar{Q}$ output at an H level. Meanwhile, when the level of the signal S4 becomes H, another flip-flop 17 is released from a cleared state and takes in the D input thereof at the rise of the clock pulse CLOCK which is the Q output of a counter 107. However, since the $\bar{Q}$ output of the D flip-flop 116 is at an H level at that time, a signal FROT, which is the Q output of the D flip-flop 117, is at an H level and a signal $\overline{FROT}$, which is the $\bar{Q}$ output of the flip-flop 117, is at an L level. Then, the PNP transistor 225 of FIG. 13 is turned on by the buffer 230. The NPN transistor 224 is turned on by the buffer circuit 232. A current, which is limited by the resistance of the conductive part 21b of the rotor 21 and the resistance of a resistor 207, flows to the conductive part 21b. The current causes the rotor 21 to turn in the CCW direction. The opaque pattern part 21f blocks the light incident on the photo transistor 32. When the signal Sig 1 reaches a predetermined level, the output level of the shaping circuit 104 changes from an L level to an H level. When the clock pulse OSC rises, the level of the Q output of the D flip-flop 116 changes from an L level to an H level. The level of the $\bar{Q}$ output of this flip-flop changes from an H level to an L level. Then, since the levels of both inputs of the AND gate 128 become H, the output level of the AND gate 128 changes from an L level to an H level. The rise of the H level output of the AND gate 128 causes the level of the output Q1 of the binary counter 114 to become H while those of other outputs Q2 and Q3 are at L. Meanwhile, since the output of the exclusive NOR gate 125 is at an L level, the output of the AND gate 126 remains at an L level. When the clock pulse CLOCK rises, the flip-flop 117 has the level of its Q output, which is the signal FROT, become an L level and that of its $\bar{Q}$ output, which is the signal $\overline{FROT}$ become an H level. The PNP transistor 225 and the NPN transistor 224 turn off. Then, the rotor 21 rotates in the CW direction. The light which then passes through the transparent part 21e of the rotor 21 comes to the photo transistor 32. The camera then operates in the same manner as described in the foregoing. With these processes repeated, when, for example, the level of the signal Sig 3 changes from an L level to an H level for the fifth time, the binary counter 114 comes to be in the condition of Q1=F1=H; Q2=F2=L; and Q3=F3=H. Therefore, the output levels of exclusive NOR gates 123, 124 and 125 become H. The output level of the AND gate 126 becomes H and that of the OR gate 170 also becomes H. The D flip-flop 115 then produces its Q output at an H level at the rise of the clock pulse OSC. This causes the output level of the OR gate 172 to become H. The D flip-flop 117 is cleared. The level of its Q output, which is the signal FROT, becomes L and its $\bar{Q}$ output, which is the signal $\overline{FROT}$ becomes H. Therefore, the current supply to the conductive part 21b of the rotor 21 is cut off. The rotor 21 comes back to its position prior to the supply of current. Meanwhile, the level of the lens barrel driving completion signal A5, which is the output of the AND gate 129, changes from an L level to an H level. The operation then shifts from the state S4 to the state S5.

The operation in the state S6 is as follows: The basic operation is identical with that of the state S4 and is, therefore, omitted from the following description. When the levels of all the outputs Q1, Q2 and Q3 of the binary counter 114 become H, that is, when the lens barrel driving power supply is repeated seven times including the operation in the state S4, the output level of the AND gate 127 becomes H. The current supply to the conductive part 21b of the rotor 21 is then cut off. The rotor 21 comes back to its original position. Further, the level of the lens barrel position correcting completion signal A7, which is the output of the AND gate 130, changes from an L level to an H level. The operation shifts from the state S6 to the state S7.

With the circuit arranged as shown in FIG. 10, if the normal process fails to be completed within a predetermined period of time, in either of the states S4 and S6, due to occurrence of such abnormality that the rotor 21 does not move, for example, the operation shifts to the state S9 to inform the photographer of the abnormality.

Exposure - State S5

Figure 18:
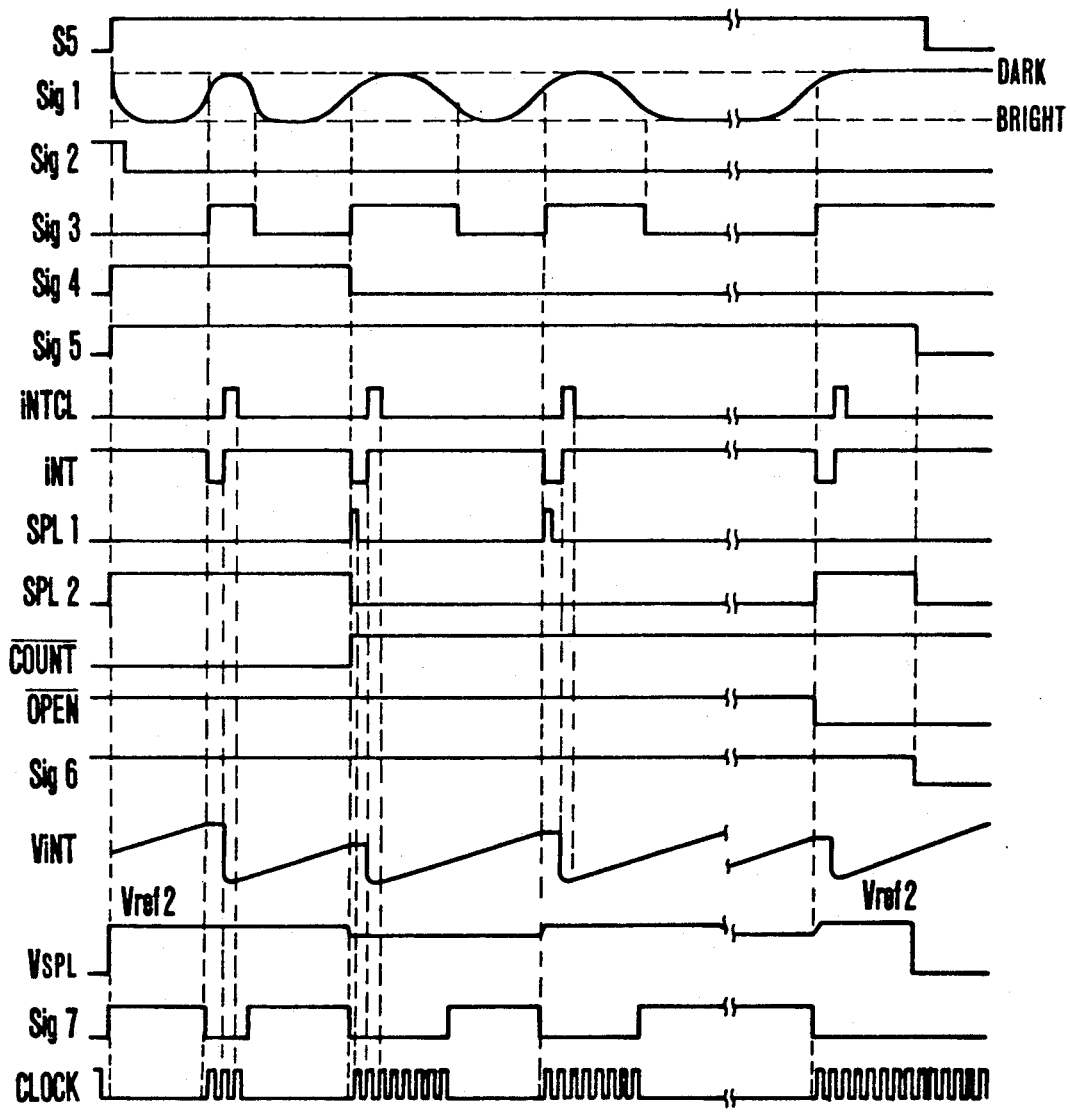
FIG. 18 is a timing chart showing an exposure effecting operation.

Referring to FIG. 18 which shows the operation in a timing chart, the output level of an inverter 188 becomes L when the signal S5 changes from an L level to an H level. D flip-flops 120, 121 and 122 are released from their cleared states. Since the $\bar{Q}$ output of another D flip-flop 119 is at an H level, the output of an AND gate 136 is also at an H level. Then, the level of the output of the OR gate 174, which is the signal SPL 2, also becomes H. The level of the output of the NOR gate 175 which is a signal $\overline{\text{EROT}}$ becomes L. As a result of this, the analog switch 213 of FIG. 13 becomes conductive. The potential VSPL of the non-inverting input terminal of the operational amplifier 218 becomes equal to the potential Vref 2 of a reference voltage source 220. The emitter potential V0 of an NPN transistor 223 then becomes a value determined by a resistance ratio between a resistor 204 and the variable resistor 227, and the above-stated potential VSPL. If the value hfe of the NPN transistor 223 is sufficiently large, the collector current of the transistor 223 becomes a value obtained by dividing the emitter potential V0 by the resistance value of a resistor 206. This current flows to the conductive part 21b of the rotor 21. Meanwhile, the output level of the OR gate 173 becomes H. The buffer circuit 192 allows a current to flow to the base of the NPN transistor 191. The NPN transistor 191 turns on. The LED 34 is energized and emits a light. Then, with the rotor 21 arranged as mentioned in the foregoing, the light emitted by the LED 34 irradiates the photo transistor 32. The level of the collector signal Sig 1 of the photo transistor 32 then changes from an H level to an L level and the output of the NAND gate 148 is latched at an L level as mentioned in the foregoing with regard to the state S1. Then, the cleared states of D flip-flops 116, 118 and 119 are cancelled to make them ready for taking in their D inputs. When a current flows to the conductive part 21b of the rotor 21, the rotor turns on the hole 21a in the CW direction. Then, the incident light on the photo transistor 32 is blocked by the first light blocking part of the opaque pattern part 21g of the rotor 21. The output level of the shaping circuit 104 changes from an L level to an H level. In synchronism with the rise of the clock signal OSC, the level of the Q output of the D flip-flop 116 changes from an L level to an H level. Since the $\overline{\text{Q}}$ output of the D flip-flop 119 is then at an H level, the output level of the AND gate 135 changes from an L level to an H level. The level of the Q output of the D flip-flop 118 changes from an L level to an H level. With the rotor 21 turned further, when the light emitted from the LED 34 again comes to the photo transistor 32, the level of the Q output of the D flip-flop 116 changes to an L level. Then, when the incident light on the photo transistor 32 is blocked by the second light blocking part of the opaque pattern part 21g with the rotor turning still further, the level of the Q output of the D flip-flop 116 changes from the L level to the H level. The output level of the AND gate 135 then again changes from an L level to an H level. The level of the Q output of the D flip-flop 119, which is a signal COUNT, changes from an L level to an H level. That of the $\overline{\text{Q}}$ output of the flip-flop 119 changes from an H level to an L level. The output level of the AND gate 135 is latched at an L level. The output level of another AND gate 136 becomes L. The level of the output of the OR gate 174, which is a signal SPL 2, also becomes L. The output level of an inverter 189 becomes H.

When the level of the Q output of the D flip-flop 116, which is a signal Sig 3, changes from L to H, that of the $\overline{\text{Q}}$ output becomes L. The level of the output of an AND gate 195, which is a signal Sig 7, becomes L. As a result, a frequency divider 107 is released from a cleared state and the signal CLOCK changes from an L level state into clock pulses. Each of D flip-flop 120, 121 and 122 takes in a D input at the rise of the signal CLOCK. After the level of the signal Sig 3 changes from L to H, the output of an AND gate 141, which is a signal SPL 1, remains at an H level until the first rise of the signal CLOCK. After the level of the signal Sig 3 changes from L to H, the level of the output of a NAND gate 169, which is a signal iNT, remains at an L level until the second rise of the signal CLOCK. Further, after the second rise of the signal CLOCK, the level of the output of an AND gate 140, which is a signal iNTCL, remains at an H level until the third rise of the signal CLOCK. These signals are produced every time the level of the shaping circuit 104 changes from an L level to an H level. Referring to FIG. 13, an analog switch 208 becomes conductive when the signal iNT is at an H level. Then, a current, which is of a value obtained by dividing the reference voltage Vref 1 by the resistance value of a resistor 201, flows to a capacitor 214 or to an analog switch 211. When the level of the signal iNTCL becomes L, the capacitor 214 is charged with a constant current. An integration wave form appears in the output voltage ViNT of an operational amplifier 217. When the level of the signal iNT becomes L, the integrating action is no longer performed and the output voltage ViNT is kept at a constant potential. When the level of the signal SPL 1 becomes H, an analog switch 212 becomes conductive. A capacitor 215 is either charged or discharged and the potential VSPL becomes equal to the potential ViNT. When the level of the signal SPL 1 becomes L, the potential VSPL is kept unchanged. The emitter potential V0 of the NPN transistor 223 becomes a value determined by the resistance ratio between the resistor 204 and the variable resistor 227, and the potential VSPL. A current of a value obtained by dividing the potential value V0 by the resistance value of a resistor 206, flows to the conductive part 21b of the rotor 21. The rotor 21 is thus driven with a constant current. When the level of the signal iNTCL becomes H, the analog switch 211 becomes conductive. The capacitor 214 is discharged. The potential ViNT drops to the value close to the potential Vref 1. When the level of the signal iNTCL becomes L, again the integrating action begins. If the integrating action is performed for a short period of time, the rotor 21 is supplied with a small current. In other words, if the rotating speed of the rotor 21 increases, the current flowing to the rotor becomes smaller. Therefore, the rotating speed of the rotor is controllable through the value of the current flowing thereto. The pitch of the opaque pattern part 21g, the value of the variable resistor 227, the potential Vref 1 of a reference voltage source 219, etc., are arranged to permit such control.

Meanwhile, when the level of the signal Sig 3 becomes H, the output level of the AND gate 144 becomes H. A counter 111 counts the rise of the output of the AND gate 144. When the count reaches a given number, the level of the Q output of this counter 111 becomes H. The output level of an inverter 187 becomes L. After that, the signal Sig 3 is no longer accepted. The level of the output of the AND gate 141, which is the signal SPL 1, becomes L. At the same time, the output level of the AND gate 143 becomes H. Therefore, the level of the output of the OR gate 174, which is the signal SPL 2, becomes H. After that, the rotor driving circuit, which is arranged as shown in FIG. 13, operates in the same manner as the operation performed when the level of the Q output of the D flip-flop 119, which is the signal COUNT, changes from an L level to an H level. More specifically, the rotor 21 is driven by a current of a value determined by the potential Vref 2 of a reference voltage source 220, resistors 204 and 206 and the variable resistor 227. Further, when the level of the output of the inverter 187, which is a signal $\overline{\text{OPEN}}$ changes from an H level to an L level, a counter 112 begins to count the clock pulses OSC. Upon completion of the count, the level of the $\overline{Q}$ output of the counter 112 becomes L. The output level of an AND gate 145 also becomes L. Concurrently with the discontinuation of the count of the counter 112, the output level of a NAND gate 167 becomes H. The levels of the two inputs of another NAND gate 168 also become H. Therefore, the output of the NAND gate 168 is latched at an L level. The level of the output of an AND gate 142 which is a signal Sig 5, becomes L. The level of the output of the NOR gate 175, which is the signal $\overline{\text{EROT}}$ becomes H. The PNP transistor 226 of FIG. 13 turns off. NPN transistors 221 and 222 turn on. The NPN transistor 223 turns off. As a result, the current flowing to the conductive part 21b of the rotor 21 is cut off. This is an exposure terminating action. The timing for this action is adjustable by means of the counters 111 and 112. In this specific embodiment, the non-inverting input voltage of the operational amplifier 218 is changed over to the voltage of the reference voltage source 220 while leaving the signal Sig 3 at an H level, for example, on the assumption that the aperture has reached a point at which it opens to a maximum degree. However, in the event of an exposure terminating action while the rotor 21 rotating speed is still controllable, the above-stated operation is not required. In cases where the power supplied to the rotor 21 is allowed to continue solely for the purpose of keeping the rotor 21 in position with the aperture fully opened as in the case of this embodiment, it is preferable, in terms of energy saving, to shift the current supply value to a value which is just enough for keeping the rotor 21 in position.

Figure 14:
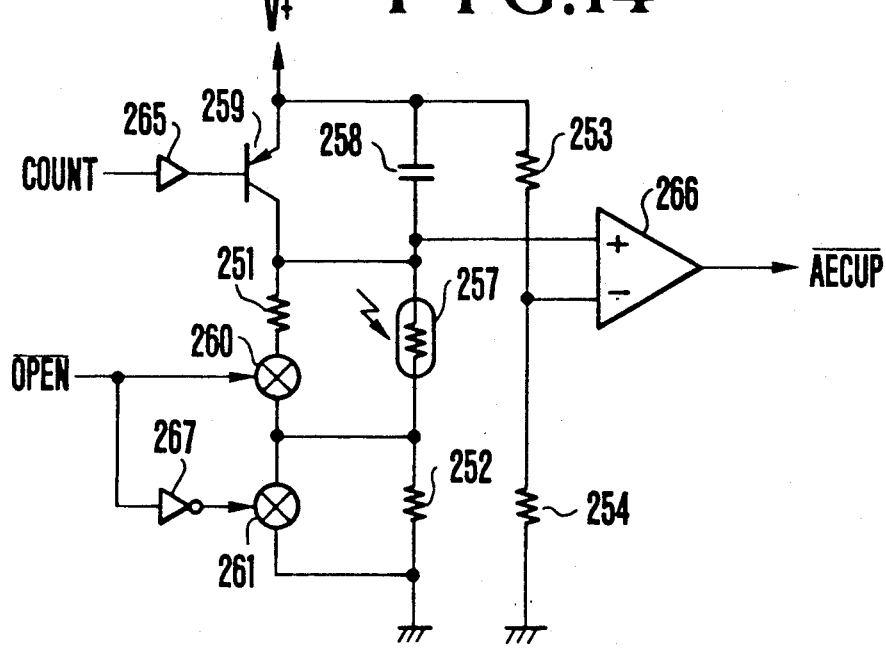
FIG. 14 is a circuit diagram showing an example of arrangement of an exposure control circuit.

FIG. 14 shows, by way of example, an exposure control circuit which is arranged to shift the output level of a comparator 266 from an H level to an L level when an adequate exposure has been effected within the above-stated exposure ending period of time. In that instance, the output level of the NAND gate 164 becomes H and the levels of both inputs of the NAND gate 163 become H. Therefore, the output of the NAND gate 163 is latched at an L level. The output level of the NAND gate 168 thus becomes L in the same manner as in the case of the above-stated exposure terminating action. Further, the level of the signal Sig 5 becomes L and that of the signal $\overline{\text{EROT}}$ becomes H. The current supply to the rotor 21 is cut off. When the output of the NAND gate 168 is latched at the L level, the output level of an inverter 185 becomes H. The counter 113 is released from a cleared state. When a given number of clock pulses OSC are counted, the level of the $\overline{Q}$ output of the counter 113 becomes L. The output of the NAND gate 165 is latched at an L level. The level of the output of an inverter 186, which is an exposure completion signal A6, becomes H. The operation shifts from the state S5 to the state S6.

In FIG. 14 which shows the example of the exposure control circuit arranged as described above, when the signal COUNT is at an L level, a PNP transistor 259 is turned on via a buffer circuit 265. A capacitor 258 is thus discharged. Before the aperture is fully open, i.e. when the signal $\overline{\text{OPEN}}$ is at an H level, an analog switch 260 is in a conductive position and the output of an inverter 267 is at an L level. Therefore, another analog switch 261 is not in a conductive position. This means that a resistor 251 and another resistor 252 are respectively connected in parallel and in series with a light measuring element which is a photo-conductive element such as a cadmium sulfide cell (CdS) 257 or the like. Variations in resistance value in relation to light intensity can be reduced by virtue of this arrangement. Therefore, the so-called $$\gamma\left(\frac{\Delta Tv}{\Delta Ev}\right)$$

value becomes small ($\gamma<1$) and the arrangement is highly suited for exposure control over the so-called half-open type shutter which increases its opening area with the lapse of time. When the level of the signal $\overline{\text{OPEN}}$ becomes L at a point at which the aperture is fully open, the analog switch 260 takes a non-conductive position and the output level of the inverter 267 becomes H. Therefore, the analog switch 261 takes a conductive position. The arrangement thus permits the exposure control to be accomplished solely by utilizing the characteristic of the photoconductive element 257. In this instance, the aperture opening area is unvarying while the exposure is variable only by exposure time. Therefore, the $\gamma$ value is preferably set at $\gamma=1$. Assuming that the characteristic of the photo-conductive element 257 is $\gamma=1$, the exposure time is $\gamma<1$ when the signal $\overline{\text{OPEN}}$ is at an H level and is $\gamma=1$ when the signal is at an L level. A period of time t between the change of the signal COUNT from an L level to an H level and the change of a signal $\overline{\text{AECUP}}$ changes from an H level to an L level can be expressed as follows:

$$t = C_{258}\left(\frac{R_{251} \cdot R_{257}}{R_{251} + R_{257}} + R_{252}\right)\ln\frac{R_{253}}{R_{253} + R_{254}}$$

$$\text{OPEN} = \text{``}H\text{''}$$

$$+ C_{258} \cdot R_{257} \ln\frac{R_{253}}{R_{253} + R_{254}}$$

$$\text{OPEN} = \text{``}L\text{''}$$

(wherein, $R_{251}$ to $R_{254}$ represent the resistance values of the resistors 251 to 254; $R_{257}$ represents the value of the photo-conductive element 257; $C_{258}$ represents the value of the capacitor 258; and a voltage between the emitter and collector of the PNP transistor 259 is assumed to be ignorable.)

The advantages of the embodiment described are as follows:

(i) The power supplied to the rotor 21 which is employed as electromagnetic driving means, is adjustable and controllable according to (or by monitoring) the actual movement of the blades of the shutter device. Therefore, a shutter opening action can be adequately accomplished in a manner apposite to the dynamic characteristic of the shutter device which is either manually or automatically preset for every photographing operation.

(ii) The shutter blade opening speed is adjustable according to a landscape mode in which the depth of field takes priority or a sport mode in which the shutter blade opening speed takes priority. Further, in cases where the shutter blade opening speed is to be finely adjusted according to the ambient light level detected by means of a brightness discriminating circuit or the like even in the same landscape or sport mode, not only the initial setting but also the actual movement of the shutter blades can be highly accurately controlled by virtue of the arrangement to feedback the actual movement of the shutter blades to the control circuit. Therefore, the quantity of light on the image plane is accurately controllable.

(iii) In the case of flash photography, variations in the timing for emission of the flash light result in errors in the quantity of light on the image plane. However, since the actual movement of the shutter blades is detected by the embodiment, the embodiment excels in flashmatic arrangements.

(iv) The start, end and intermediate states of the shutter blade movement, etc., are detected by optical detecting means of a non-contact type. This ensures less fluctuating results of detection, so that the camera according to this invention excels in durability and reliability.

Film feeding - State S7

Figure 16:
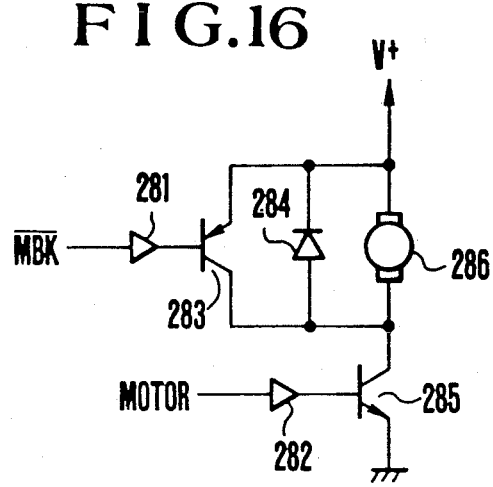
FIG. 16 is a circuit diagram showing, by way of example, the arrangement of a film winding circuit.

When the level of the signal S7 becomes H, the output level of the OR gate 173 becomes H. The buffer circuit 192 causes the NPN transistor 191 to turn on. The LED 34 emits a light. The light passes through the transparent part 21e of the rotor 21 and the hole 31c of the indexing plate 31 and then reaches the photo transistor 2. The level of the collector signal Sig 1 of the photo transistor 32 changes from H to L. The signal Sig 1 is shaped by the shaping circuit 104 and is then supplied to the NAND gate 149. The output of the NAND gate 149 is at an H level. Since the output level of the OR gate 73 is at an H level, the output level of the NAND gate 48 becomes L. A counter 199 is released from a cleared state. Meanwhile, an AND gate 131 is producing an output which is similar to the clock pulses OSC. Therefore, the counter 199 begins to count the pulses of the output of the AND gate 131. The $\overline{Q}$ output of the counter 199 remains at an H level until completion of a count of a given number. The output of an OR gate 198 is at an H level. The level of the output of an AND gate 132, which is a signal MOTOR, is at an H level. In case that a film winding circuit is arranged as shown in FIG. 16, an NPN transistor 285 is turned on via a buffer 282. A current is supplied to a motor 286. The indexing plate 31 rotates as mentioned in the foregoing. Then, the light blocking part of the indexing plate 31 comes to block the light incident on the photo transistor 32. The output level of the shaping circuit 104 becomes H. The output of the OR gate 198 remains at the H level. The number to be counted by the counter 199 is at such a value that ensures a period of time long enough to permit the above-stated process. When the level of the $\overline{Q}$ output of the counter 199 becomes L after completion of counting the predetermined number, the output of the OR gate 198 remains at the H level. With the indexing plate 31 further rotated, when the light of the LED 34 again comes to the photo transistor 32, the output level of the shaping circuit 104 becomes L. That of the OR gate 198 also becomes L. Therefore, the level of the output of the AND gate 132, which is the signal MOTOR, becomes L. The NPN transistor 285 turns off to cut off the current supplied to the motor 286. At the same time, the output level of an inverter 180 becomes H. Therefore, an MM (monostable multivibrator) 103 produces its $\overline{Q}$ output, which is a signal $\overline{MBK}$, and remains at an L level just for a given period of time. Further, the output level of an inverter 182 becomes L. A counter 110 begins to count the pulses of the output of an AND gate 133 which are the clock pulses of the signal OSC. With the signal $\overline{MBK}$ remaining at the L level for the given period of time, a PNP transistor 283 is caused, via a buffer circuit 281, to be ON for a given period of time. The transistor 283 absorbs the electric charge of the motor 286 to prevent the motor from being further rotated by the force of inertia. A diode 284 is arranged to absorb the back electromotive force of the motor 286. When a given number of pulses are counted by the counter 110 (for the purpose of securing a period of time required for allowing the motor 286 to settle after coming to a stop), the level of the Q output of the counter 110 becomes H to give a signal A8. The operation shifts from the state S7 to the state S8. Further, a film rewinding operation may be arranged to be automatically carried out according to a known method of detecting film winding time. In loading the camera with a film, two or three frame portions of the film may be arranged to be automatically wound up by a known blank feeding device using some frame number signal or the like.

Figure 19:
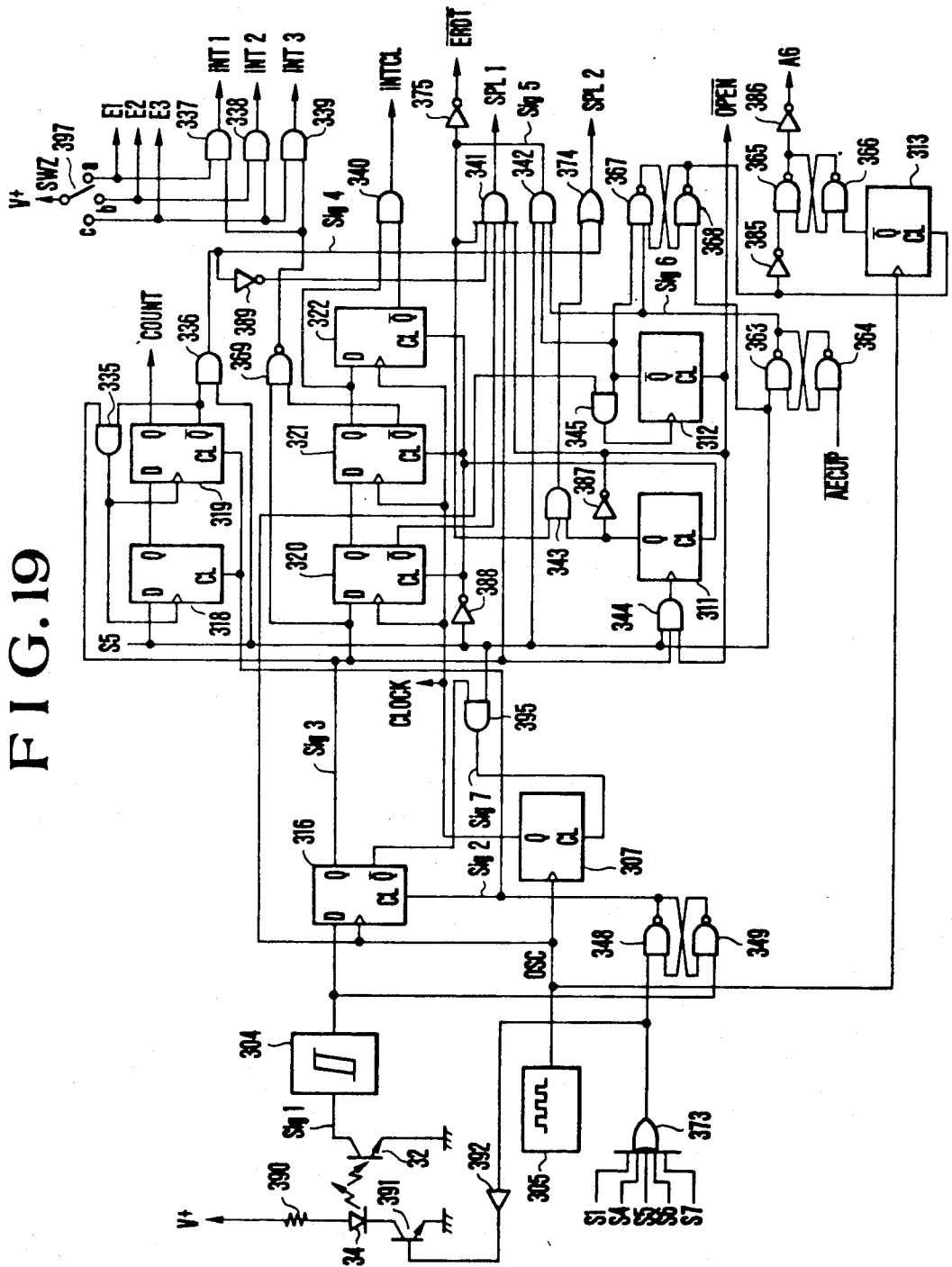
FIG. 19 is a circuit diagram showing the arrangement of another example of the control circuit which provides the driving device of FIG. 1 with a sequence of the operating procedures of the camera.
Figure 20:
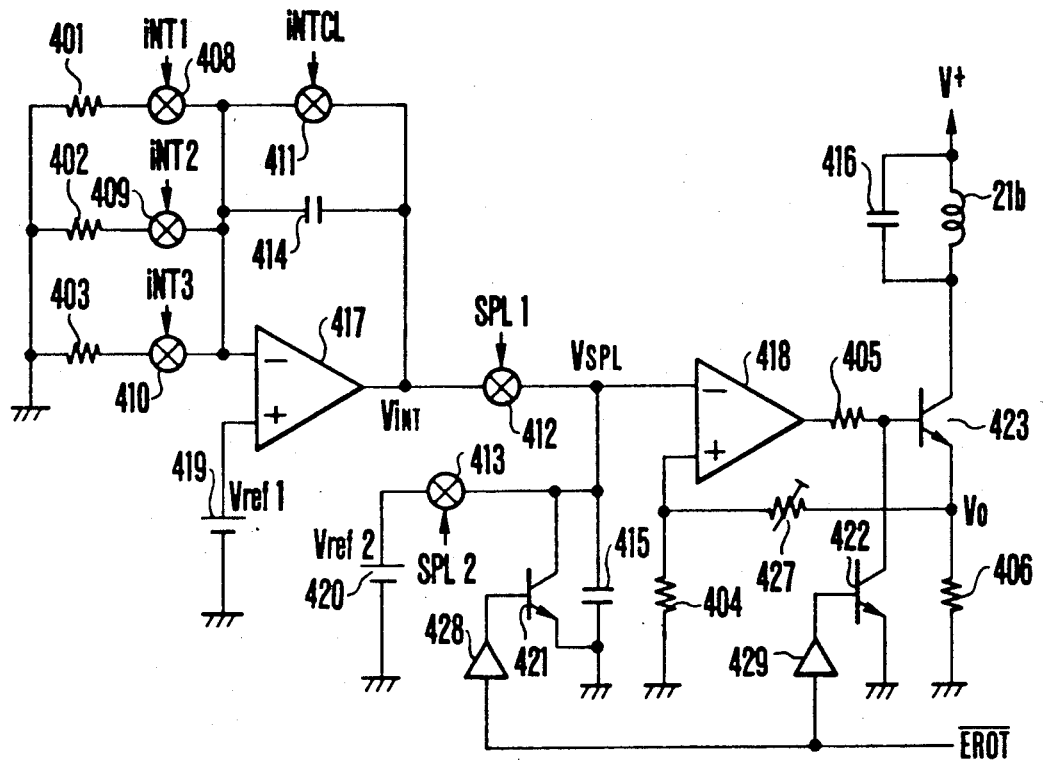
FIG. 20 is a circuit diagram showing, by way of example, the arrangement of a rotor driving circuit arranged for the control circuit of FIG. 19.
Figure 26:
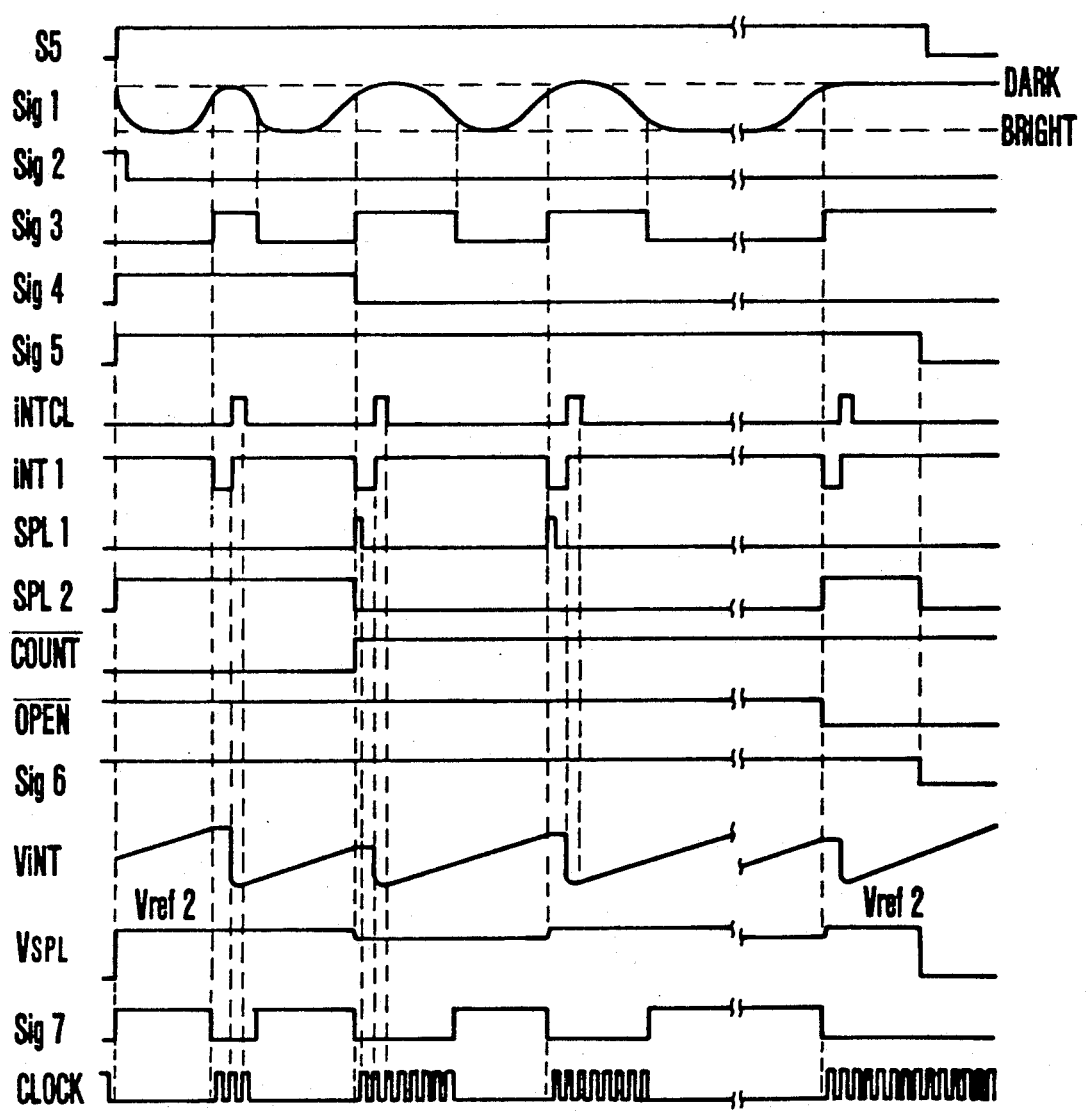
FIG. 26 is a timing chart showing an exposure effecting operation.

FIG. 19 shows another example of circuit arrangement for performing exposure control over the mechanism shown in FIG. 1. Referring to FIG. 19, when the level of the signal S5 changes from L to H as shown in FIG. 26, which shows the operation of the circuit of FIG. 19 in a timing chart, the output level of an inverter 388 becomes L. D flip-flops 320, 321 and 322 are released from their cleared states. Meanwhile, the $\overline{Q}$ output of a D flip-flop 319 is at an H level. Therefore, the output level of an AND gate 336 and the level of the output of an OR gate 374 which is the signal SPL 2 also become H levels, respectively. The output of an inverter 375, which is the signal $\overline{EROT}$, becomes an L level. Therefore, an analog switch 413, which is shown in FIG. 20, becomes conductive. As a result, the potential VSPL of the non-inverting input terminal of an operational amplifier 418 becomes equal to the potential Vref 2 of a reference voltage source 420. The emitter potential V0 of an NPN transistor 423 becomes a value determined by a resistance ratio between a resistor 404 and a variable resistor 427, and the above-stated potential VSPL. If the value hfe of the NPN transistor 423 is sufficiently large, the collector current of the transistor 423 becomes a value obtained by dividing the emitter potential V0 by the resistance value of a resistor 406. The current thus obtained flows to the conductive part 21b of the rotor 21. The output level of an OR gate 373 becomes H. A buffer circuit 392 supplies a current to the base of an NPN transistor 391 to turn it on. The LED 34 is energized and emits a light. Then, the rotor 21 is in a position to allow the light of the LED 34 to come to irradiate the photo transistor 32. The level of the collector signal Sig 1 of the photo transistor 32 changes from H to L. The output of a NAND gate 348 is latched at an L level. Then, D flip-flops 316, 318 and 319 are released from their cleared states and are ready for taking in D inputs. With the current flowing to the conductive part 21b as mentioned above, the rotor 21 turns clockwise around its hole 21a. The light incident on the photo transistor 32 is blocked by the first light blocking (opaque) part of the opaque pattern 21g of the rotor. The output level of a shaping circuit 304 changes from an L level to an H level. In synchronism with the rise of the clock signal OSC, the level of the Q output of the D flip-flop 316 changes from an L level to an H level. Then, since the $\overline{Q}$ output of the D flip-flop 319 is at an H level, the output level of an AND gate 335 changes from L to H. In response to the rise of the output of the AND gate 335, the level of the Q output of the D flip-flop 318 changes from L to H. With the rotor 21 turning further clockwise, when the light emitted by the LED 34 again comes to the photo transistor 32, the level of the Q output of the D flip-flop 316 changes to an L level. Then, with the rotor 21 turning still further clockwise, when the second light blocking part of the opaque pattern 21g of the rotor comes to block the light incident on the photo transistor 32, the level of the Q output of the D flip-flop 316 again changes from L to H. The output level of the AND gate 335 then again changes from L to H. The level of the Q output of the D flip-flop 319, which is a signal COUNT, changes from L to H. The level of its $\overline{Q}$ output changes from H to L. The output of the AND gate 335 is latched at an L level. The output level of another AND gate 336 becomes L. The level of the output of the OR gate 374, which is a signal SPL 2, also becomes L. The output level of an inverter 389 becomes H. Meanwhile, when the level of the Q output of the D flip-flop 316 which is a signal Sig 3, changes from L to H, that of the $\overline{Q}$ output of the flip-flop 116 becomes L. The level of the output of an AND gate 395, which is a signal Sig 7, becomes L. A frequency divider 307 is released from a cleared state. Then, the signal CLOCK changes from an L level state into clock pulses. At the rise of the signal CLOCK, each of D flip-flops 320, 321 and 322 takes in a D input. During a period between the change of the signal Sig 3 from L to H and the first rise of the signal CLOCK, the output of an AND gate 341, which is a signal SPL 1, remains at an H level, and a signal El also at an H level if a manual change-over switch 397 is connected to its terminal a. During a period between the change of level of the signal Sig 3 from L to H and the second rise of the signal CLOCK, the output of an AND gate 337, which is a signal iNT 1, remains at an L level. During a period between the second rise and the third rise of the signal CLOCK, the output of an AND gate 340, which is a signal iNTCL, remains at an H level. These signals are produced every time the output level of a shaping circuit 304 changes from L to H. Referring to FIG. 20, when the signal iNT 1 is at an H level, an analog switch 408 becomes conductive. Then, a current of a value obtained by dividing a reference voltage Vref 1 by the resistance value of a resistor 401, flows to a capacitor 414 or to an analog switch 411. When the level of the signal iNTCL becomes L, the capacitor 414 is charged with a constant current. An integration wave form then appears in the output voltage ViNT of an operational amplifier 417. When the level of the signal iNT 1 becomes L, integration is no longer performed and the output voltage ViNT of the operational amplifier 417 is kept at a constant potential. When the level of the signal SPL 1 becomes H, an analog switch 412 becomes conductive. A capacitor 415 is either charged or discharged and a potential VSPL becomes equal to the potential ViNT. When the level of the signal SPL 1 becomes L, the potential VSPL is kept constant. Then, the emitter potential V0 of the NPN transistor 423 becomes the value determined by a resistance ratio between the resistance value of the resistor 404 and the variable resistor 427, and also by the potential VSPL. A current of a value obtained by dividing this potential V0 by the resistance value of the resistor 406 flows to the conductive part 21b of the rotor 21. The rotor 21 is thus driven with a constant current.

When the level of the signal iNTCL becomes H, the analog switch SW 411 becomes conductive. The capacitor 414 is discharged. Then, the potential ViNT drops to the potential Vref 1. When the level of the signal iNTCL becomes L, the integrating action is resumed. The current supplied to the rotor 21 becomes small if the integrating time is short. In other words, the current becomes smaller according as the rotating speed of the rotor 21 increases. Therefore, the rotating speed of the rotor 21 is controllable through adjustment of the pitch of the opaque pattern 21g, the potential Vref 1 of the reference voltage source 419 provided for the variable resistor 427, etc.

Meanwhile, when the level of the signal Sig 3 becomes H, the output level of an AND gate 344 becomes H. The rise of the output of the AND gate 344 is counted by a counter 311. Upon completion of counting a predetermined number, the level of the Q output of the counter 311 becomes H. The output level of an inverter 387 becomes L. The signal Sig 3 is no longer accepted thereafter. Further, the level of the output of the AND gate 341, which is a signal SPL 1, becomes an L level. At the same time, the output level of an AND gate 343 becomes H. This causes the level of the output of the OR gate 374, which is the signal SPL 2, becomes H. The ensuing operation of the rotor driving circuit which is arranged as shown in FIG. 20 is similar to the operation performed when the level of the Q output of the D flip-flop 319, which is the signal COUNT, comes to change from an L level to an H level. More specifically, the rotor 21 is driven with a current of a value determined by the potential Vref 2 of a reference voltage source 420, resistors 404 and 406 and the variable resistor 427. Further, when the level of the output of an inverter 387, which is a signal $\overline{OPEN}$, changes from an H level to an L level, a counter 312 begins to count the clock pulses OSC. Upon completion of counting a given number of pulses, the level of the $\overline{Q}$ output of the counter 312 becomes L. The output level of the AND gate 345 becomes L. The counter 312 stops counting. The output level of a NAND gate 367 becomes H. The levels of two inputs of a NAND gate 368 both become H. The output of the NAND gate 368 is latched at an L level. The level of the output of an AND gate 342, which is a signal Sig 5, becomes L. The level of the output of a NOR gate 375, which is a signal $\overline{EROT}$, becomes H. NPN transistors 421 and 422 of FIG. 20 turn on. Another NPN transistor 423 turns off. Therefore, the current supply to the conductive part 21b of the rotor 21 is cut off. This is the so-called exposure ending action. The timing for this ending action is adjustable by means of the counters 311 and 312. In this specific embodiment, the non-inverting input voltage of an operational amplifier 418 is changed over to the voltage of a reference voltage source 420 with the signal Sig 3 left at its H level state, for example, on the assumption that the aperture comes to a point at which it is in a full open position. However, in case that the exposure terminating action is to be performed while the rotating speed of the rotor, is still controllable, the above-stated operation is unnecessary. In cases where the current supplied to the rotor, is allowed to continue solely for the purpose of keeping the rotor, in position with the aperture fully opened as in the case of this embodiment, it is preferable, in terms of energy saving, to shift the current supply value to a value which is just enough for keeping the rotor, in position.

Figure 21:
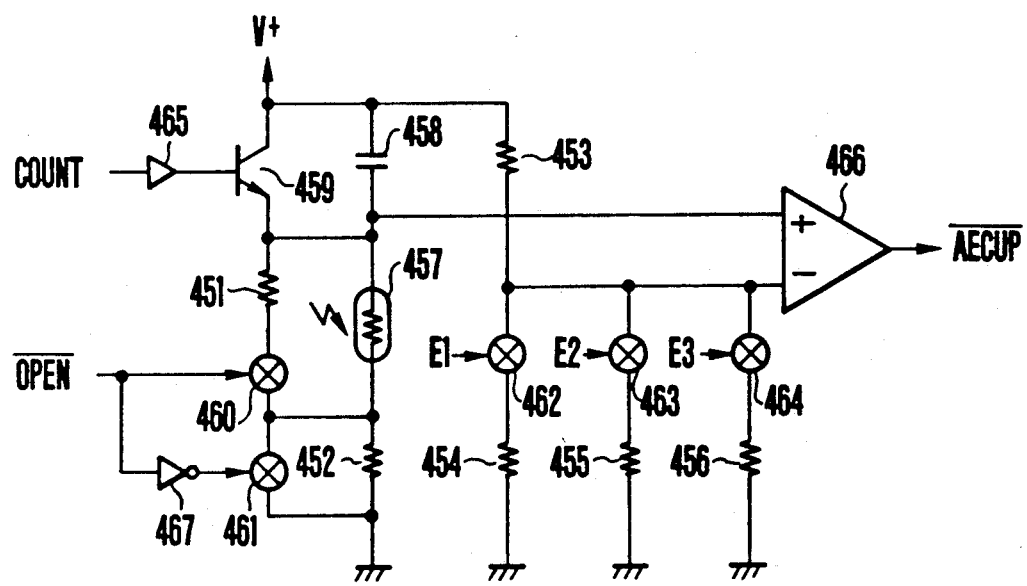
FIG. 21 is a circuit diagram showing by way of example, an exposure control circuit arranged for the control circuit of FIG. 19.

Next, where an exposure control circuit is arranged as shown in FIG. 21, for example, if the exposure light becomes insufficient within the period of time of the above-stated exposure terminating action, the output level of a comparator 466 changes from H to L. Then, the output level of a NAND gate 364 becomes H. The levels of two inputs of another NAND gate 363 both become H. The output of the NAND gate 363 is latched at an L level. Then, in the same manner as in the above-stated exposure terminating action, the output level of the NAND gate 368 becomes L. Further, the level of the signal Sig 5 becomes L. Then, when the level of the signal $\overline{\text{EROT}}$ becomes H, the current supplied to the rotor 21 is cut off. With the output of the NAND gate 368 latched at the L level, the output level of an inverter 385 becomes H. Then, the counter 313 is released from a cleared state and begins to count a given number of pulses of the clock pulse signal OSC. Upon completion of the count, the level of the $\overline{Q}$ output of the counter becomes L. The output of a NAND gate 365 is latched at an L level. The level of the output of an inverter 386, which is an exposure completion signal A6, becomes H. The operation then shifts from the state S5 to the state S6.

In the case of the exposure control circuit of FIG. 21, when the signal COUNT is at an L level, a PNP transistor 459 is turned on through a buffer circuit 465. A capacitor 458 is discharged. Before the aperture is opened to a full extent, i.e. when the signal $\overline{\text{OPEN}}$ is at an H level, an analog switch 460 is conductive and the output of an inverter 467 is at an L level. Therefore, another analog switch 461 is in a non-conductive position. This represents a state in which a resistor 451 is connected in parallel with and another resistor 452 in series with a light measuring element which is, for example, a photo-conductive element such as a cadmium sulfide cell (CdS) 457 or the like. This arrangement lessens variations in the resistance value in relation to the intensity of light. It thus ensures a small value of $$\gamma \left( \frac{\Delta T v}{\Delta E v} \right)$$

(wherein $\gamma < 1$). This circuit arrangement is suited for exposure control over a half-open type shutter in which the aperture area increases according to the lapse of time. The level of the signal $\overline{\text{OPEN}}$ becomes L at a point where the aperture is fully opened. Then, the analog switch 460 becomes non-conductive and the output level of the inverter 467 changes to an H level. Therefore, the analog switch 461 becomes conductive. The exposure control thus can be accomplished solely according to the characteristic of the photo-conductive element 457. In this instance, exposure time alone changes while the aperture area remains unvarying. Therefore, the value $\gamma$ can be adequately selected as $\gamma = 1$. With a photoconductive element 457 of the characteristic of $\gamma = 1$ employed, the exposure time becomes $\gamma < 1$ when the signal $\overline{\text{OPEN}}$ is at an H level and $\gamma = 1$ when the signal $\overline{\text{OPEN}}$ is at an L level. Assuming that the signal E1 is at an H level, a period of time t, between the change of the signal COUNT from an L level to an H level and the change of a signal $\overline{\text{AECUP}}$ from an H level, to an L level can be expressed as follows:

$$t = C_{458} \left( \frac{R_{451} \cdot R_{457}}{R_{451} + R_{457}} + R_{452} \right) \ln \frac{R_{453}}{R_{453} + R_{454}}$$

OPEN = "H"

$$+ C_{458} \cdot R_{457} \ln \frac{R_{453}}{R_{453} + R_{454}}$$

OPEN = "L"

(wherein $R_{451}$ to $R_{454}$ represent the resistance values of resistors 451 to 454 respectively; $R_{457}$ the value of the photo-conductive element 457; and $C_{458}$ the value of a capacitor 458.)

Further, the formula above is based on the assumption that, when the PNP transistor 459 is ON, the voltage between the emitter and the collector thereof is negligible.

When a switch member 397 (SWZ), which is shown in FIG. 19, shifts its connecting position either to a terminal b or to another terminal c thereof, the embodiment operates as follows: In case that a signal E1 is at an L level, a signal E2 at an H level and a signal E3 at an L level, the above-stated exposure time t becomes as expressed below:

$$t = C_{458} \left( \frac{R_{451} \cdot R_{457}}{R_{451} + R_{457}} + R_{452} \right) \ln \frac{R_{453}}{R_{453} + R_{455}} +$$

$$C_{458} \cdot R_{457} \ln \frac{R_{453}}{R_{453} + R_{455}}$$

Therefore, the exposure time is shiftable. Likewise, if the level of the signal E1 is at L, that of the signal E2 at L and that of the signal E3 at H, the exposure time t becomes as expressed below:

$$t = C_{458} \left( \frac{R_{451} \cdot R_{457}}{R_{451} + R_{457}} + R_{452} \right) \ln \frac{R_{456}}{R_{453} + R_{456}} +$$

$$C_{458} \cdot R_{457} \ln \frac{R_{456}}{R_{453} + R_{456}}$$

Meanwhile, in the case of FIG. 20, the driving operation on the rotor 21 is determined by a resistor when the signal E1 is alone at an H level during a period between the change of the level of the signal COUNT to H and that of the signal $\overline{\text{OPEN}}$ to L; determined by a resistor 402 when the signal E2 is alone at an H level during that period; and determined by a resistor 403 when the signal E3 is alone at an H level during that period, with the value of the current supplied to the conductive part 21b changed by adjusting the gradient of the above-stated integration potential ViNT in relation to time by using one of these resistors, as applicable.

With the opening time of the aperture and the exposure time appropriately adjusted in the manner as described above, the so-called program conversion can be accomplished by adjusting the opening area, i.e. an aperture value, and the exposure time according to the brightness of the object to be photographed.

FIG. 22 shows an example of a flash control circuit to be used in carrying out photographing with such an auxiliary light as a flash light. Referring to FIG. 22, a distance measuring circuit 501 stores information or data on the result of a distance measurement and is arranged to produce the data in the form of signals F1, F2 and F3. Assuming that the switch member 397 (SWZ) of FIG. 19 is connected to its terminal b, the signal E2 is at an H level. The signal Sig 3 generates pulses accordingly as the rotor 21 rotates. The output of an OR gate 506 is at an H level. Therefore, an AND gate 504 likewise produces pulses. Meanwhile, as mentioned in the foregoing, the level of the signal COUNT becomes H at the rise of the second pulse of the signal Sig 3. The output level of the OR gate 506 is thus also at an H level. Therefore, the output level of a NAND gate 507 changes from H to L. A binary counter 503 is released from a cleared state. In the case that, for example, the distance measurement signals F1 and F2 are at H levels and the distance measurement signal F3 at an L level, the outputs Q1, Q2 and Q3 of the binary counter 503 which are obtained at the rise of the third H level pulse of the signal Sig 3 after the change of the signal COUNT to an H level, become as follows: $Q1 = F1 = H$; $Q2 = F2 = H$; and $Q3 = F3 = L$. The output level of each of exclusive NOR gates 508 and 510 becomes H. The output level of an AND gate 505 changes from L to H. A flash unit 502 is triggered to flash. In case that the switch member 397 (SWZ) of FIG. 19 is connected to another terminal c, the level of the signal E3 becomes H. However, the flash control circuit operation is performed in exactly the same manner as described above. More specifically, the pulses of the signal Sig 3 are counted and the flash unit 502 flashes when the opening area of the shutter, i.e. the aperture, reaches a given value corresponding to the distance data. FIG. 23 shows the aperture opening degree in relation to the timing for flashing. FIG. 24 shows an example of distance measurement data. When the distance measurement data is obtained as shown in FIG. 24, flash light is emitted when each of the aperture opening degrees or aperture values 1 to $\gamma$ is obtained while the signals E2 and E3 are at their H levels.

Further, in cases where the aperture value corresponding to the distance data must be changed according to the value of film sensitivity, this adjustment can be readily accomplished, for example, by just changing the number to be counted by the binary counter 503.

In the case of flash photography, the signals E2 and E3 are arranged to be produced by manually operating the switch member 397 (SWZ) of FIG. 19. This arrangement may be replaced with an arrangement in which the brightness of the object is detected and the signals E2 and E3 are electrically produced. In other words, the signal E1 is produced at an H level for ordinary photography. In the event of flash photography, the signal E2 is produced at an H level if the brightness of the object exceeds a given level or the other signal E3 is produced at an H level if the brightness is below that level. The object brightness judging level may be set at a plurality of points in accomplishing the control operation described. This arrangement is advantageous particularly in cases where flash light is to be used for an object of relatively high brightness, because, in such a case, if the time of the half-opening range of the shutter is long, the camera tends to be shaken due to hand vibrations. The embodiment brings about an exceptionally advantageous effect particularly on a daylight synchronized flash photographing operation, because: The flash light is emitted always when the aperture value reaches a predetermined value. In that instance, since the brightness of field can be found beforehand, the shutter opening speed is set in such a manner that the flash device becomes capable of flashing before an exposure is brought to an apposite degree by the exposure control circuit.

Figure 25:
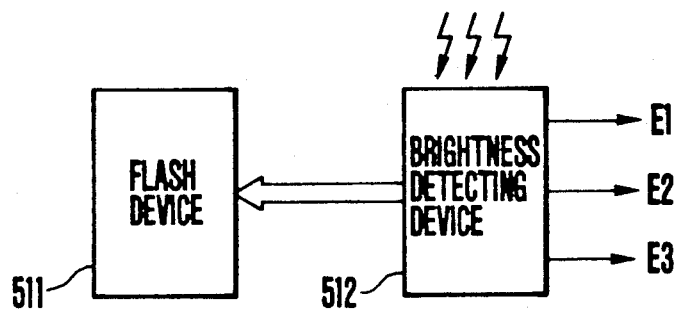
FIG. 25 is a diagram showing an example of a circuit for detecting the brightness of a photographing field.

FIG. 25 shows in a block diagram the arrangement for carrying out the above-stated method. The brightness of the field is detected by a brightness detecting device 512. The above-stated signals E1, E2 and E3 which are for changing the opening degree of the shutter blades, are arranged to be produced from the device 512. The exposure program is arranged to be automatically changed with these signals. In addition to that, a flash device 511 is arranged to receive a start signal and a flashing signal. This arrangement enables the camera to automatically emit a flash light according to the brightness of the field without having the flash device operated by the photographer and also to vary the exposure program. The brightness detecting device 512 and the flash device 511 can be readily arranged by persons skilled in the art in accordance with the conventionally known technique. Further, it goes without saying that the signals E1, E2 and E3, which are arranged to vary the exposure program according to the brightness of the field, can be increased in number by modifying the shutter control circuit and the exposure control circuit which receive these signals accordingly.

Further, instead of simply detecting the brightness of the field, the camera may be arranged according to this invention to automatically emit a flash light by automatically discriminating the so-called rear light condition by separately detecting the brightness values of different parts, such as middle and peripheral parts, within a photographing angle of view; and to obtain a photographing mode of preventing the troubles due to introduction of hand vibrations by setting the shutter opening speed at a higher speed than the opening speed normally employed for use of a flash light under a dark condition. These varied advantages are attainable by applying this invention to known photographing methods.

In this specific embodiment, in addition to the method of automatically controlling the shutter opening wave form by detecting the level of ambient light, manual switch part is provided to permit manual control. The manual switch part may be provided with some indications of the landscape mode, the sport mode, etc. Such arrangement facilitates selection of the landscape mode when a deep depth of field is desired. In that event, an aperture opening wave form is obtained with the signal E3 at an H level as shown in FIG. 23. The sport mode also can be readily selected. In that instance, another aperture opening wave form obtains for photographing when the signal E1 is at an H level.

This invention is not limited to the specific embodiments described. The shutter device of course may be arranged variously in different manners in accordance with this invention. For example, referring to the circuit of FIG. 13, since the conductive parts 21b of the rotor 21 can be driven with a constant current, any variations in the magnetic flux density of the magnetic circuit formed by the yokes 22 and the permanent magnet due to temperature variations can be prevented from affecting the stable operation of the rotor 21 by arranging the resistor 206 or 201 and the reference voltage source 219 to have a temperature characteristic capable of compensating for such variations. In the exposure control circuit of FIG. 14, the value $\gamma$ of exposure time is arranged to be shifted at a maximum aperture opening point. However, a shutter system of a higher degree of precision having stable shutter blade movement can be obtained by including therein an exposure control system arranged to perform the γ conversion by an optical signal according to the conventional shutter arrangement using an auxiliary stop.

In the case of a camera having no auxiliary stop, for example, the quantity of light on the image plane is determined by the external light of the object, shutter time and the opening or aperture area of the shutter.

Despite of use of a governor or the like, the variations in the opening area of the shutter blades generally give a complex time function due to the inertia and shapes of various moving members as shown in FIG. 27(a). Hence, the variations of the area of shutter blade opening are not always in a linear relation to time. However, the variations of the shutter blade opening area can be arranged to be in a linear relation to time as shown in FIGS. 27(b) and 27(c) by having information on the shutter blade movement fed back to a control circuit. In that instance, as well known, the relation $$\frac{\Delta Tv}{\Delta Ev}$$

within the half-open region becomes simple to permit accurate control over the light quantity on the image plane by controlling the operating time of the shutter device through a simple computation. Therefore, the exposure control device can be compactly arranged. Further, in the case of a flash photographing operation, the aperture value can be found from time information relative to the lapse of opening time, so that a highly accurate exposure control can be accomplished in a simple manner.

Further, in the case of a camera of the kind having an auxiliary stop, the auxiliary stop is designed to be electrically and mechanically in a specific relation to a main stop. However, considering various factors such as a limit of working tolerance, etc., it is not always easy to keep a highly precise correlation between the auxiliary stop and a main stop. Whereas, in accordance with this invention, the shutter blade opening speed of the main stop or the auxiliary stop can be electrically corrected. This feature enlarges the latitude in designing, for example, the auxiliary stop and permits a working error to be absorbed by adjusting an electrical circuit. Therefore, exposure control can be accomplished with a high degree of precision in accordance with this invention.

In the specific embodiment described, time is converted into a voltage by an integration circuit and the voltage is further converted into a current. However, this method may be replaced with some different method. For example, the cycle of the light signal mentioned in the foregoing is measured by means of a number of clock pulses produced from an oscillator. The number of clock pulses is converted into a voltage and is further converted into a current through a D-A converting process. In another conceivable modification example, a current source is arranged to produce currents in varied values; and the current value is varied in a digital manner according to the cycle of the above-stated light signal. In a further conceivable modification example, a driving voltage or current is set at an unvarying value; and the amount of work within a given period of time is arranged to be adjustable by varying the driving time.

The embodiment described is arranged to detect and check the operation of the shutter AF and that of the film winding device. However, in accordance with this invention various other operations can also be checked and detected, including for example: Making a discrimatination between the presence and absence of film; discrimination between opened and closed states of a back cover; detection of the leading curtain and the trailing curtain of a focal plane shutter; detection of the stopping-down lever of a front plate and an automatic stopping lever; and detection of the operating state of other combinations of two or more different driving devices.

The photo-interrupter which is employed as the optical detecting means as stated in the foregoing, may be replaced with some magnetic or other non-contact type detecting means.

As described in the foregoing, the camera according to this invention comprises shutter blades; driving means which, when energized, drives the shutter blades to open; optical detecting means for optically detecting the operating state of the shutter blades; and a control circuit which, in response to the output of the optical detecting means, varies the amount of a current supplied to the driving means for controlling the opening speed of the shutter blades through an arrangement to feedback the opening speed of the shutter blades. The camera is, therefore, capable of highly accurately controlling the opening speed of the shutter blades which determines the quantity of light incident on the image plane and is capable of obtaining an apposite light quantity without being affected by such external conditions as variations in the camera holding posture, temperature, humidity, etc.

In accordance with this invention, the opening speed of the shutter blades can be accurately varied. Therefore, the shutter blade opening speed can be adequately adjusted to suit each of different modes of the operation such as the so-called sport mode, the londscape mode, etc. Further, in accordance with this invention, in the case of flash photographing, the opening speed of the shutter blades is made slower than ordinary photographing to ensure that the flash device is allowed to flash accurately when the shutter blades are in an apposite opening position. In addition to that, in the event of flash photographing under a relatively bright external light condition, such as in the case of daylight synchronized flash photography, the shutter blade opening speed is set at a higher speed than in flash photographing under a dark condition, so that the photograph thus taken can be prevented from blurring due to hand vibrations. In other words, as shown in FIG. 28, the steepness of the inclinations of straight lines 1, 2 and 3 representing the opening speeds of the shutter blades decreases according as the opening speed of the shutter blades becomes slower. Assuming that the shutter blade opening position at which an apposite exposure is obtainable by the flash light of the flash device is Sa, the length of the periods of time t1, t2 and t3, adoptable for the flashing timing of the flash device, increases accordingly as the opening speed of the shutter blades becomes slower. An apposite flashing timing thus becomes more easily obtainable for the flash device accordingly as the shutter blade opening speed decreases. Therefore, in accordance with this invention, the shutter blade opening speed is arranged to be slower for flash photographing, so that an exposure with a flash device can be accurately accomplished. Meanwhile, a slower opening speed of the shutter blades results in a longer opening time of the shutter which tends to result in a blurred picture due to hand vibrations. In the case of flash photographing under a dark external light condition, the shutter is open virtually only for a period of time during which the flash device flashes. Therefore, the slow shutter blade opening speed presents no problem. Whereas, in the event of flash photographing under a relatively bright external light condition, however, an excessively slow opening speed of the shutter blades would bring about the problem of the hand vibrations because of the adverse effect of the external light. In view of this, in accordance with this invention, the problem of hand vibrations is prevented by making the shutter blade opening speed faster than the ordinary flash photographing speed in the event of flash photographing under a relatively bright external light condition while an adequate flashing timing of the flash device is ensured by lowering the opening speed of the shutter blades for flash photography. Therefore, in accordance with this invention, not only the flash photographing exposure can be stabilized but also the problem of hand vibrations can be effectively prevented. This is a great advantageous effect of this invention.

In accordance with this invention, the optical detecting means is employed for detecting the moving state of the shutter blades. Therefore, unlike the use of a switch which must be brought into contact with the shutter blades, such as a mechanical switch, the detecting means of this invention requires no contact with the shutter blades. Therefore, the movement of the shutter blades can be highly precisely detected. The detecting means is highly suited for feedback control over the opening speed of the shutter blades. Unlike a mechanical switch, it never causes such a trouble as having insufficient conductivity due to sticking of dust or the like to a contacting part and thus ensures a much higher reliability. Further, in accordance with this invention, the optical detecting means is used not only for detecting the movement of the shutter but also for detecting the operating states of various devices in a sequence of the operating processes of the camera such as the shifting state of a photo-taking lens during a focusing operation, film feeding during a film winding operation, etc. The sequence of processes of the camera therefore can be accurately controlled as a whole. The common use of one and the same optical detecting means also permits reduction in the number of parts and in cost. Further, in detecting the operating states of various devices with a common optical detecting means, the camera can be promptly and accurately shifted from the focusing process to the exposure effecting process as the shift of the photo-taking lens for focusing and the movement of the shutter blades in effecting an exposure are arranged to be detected by the optical detecting means through detection of the movement of one and the same moving member which is interlocked with these members. The camera, therefore, can be operated without missing a shutter chance.

In accordance with this invention, the use of the optical detecting means in common for detecting the operating states of various device as a whole permits prompt detection of any malfunction to facilitate taking some appropriate countermeasure. The use of the optical detecting means also permits detection of the details of such malfunction. For example, the degree of deviation of the operating speed of a device from a correct speed can be found. Therefore, for example, the camera can be arranged to give a warning to the photographer before it becomes actually inoperative when a battery of the camera is consumed to a given degree.

What is claimed is:

1. A camera comprising:
   (a) shutter blades;
   (b) driving means for driving said shutter blades, said driving means being arranged to drive said shutter blades to open when driving means is energized;
   (c) optical detecting means for optically detecting an operating state of said shutter blades; and
   (d) control means for controlling an opening speed of said shutter blades by varying an amount of electric energy supplied to said driving means in response to an output of said optical detecting means, said control means including switching means for changing the opening speed of said shutter blades from one speed to another and shifting means for shifting a position of said switch means to lower the opening speed of said shutter blades in the event of flash photographing.

2. A camera comprising:
   (a) shutter blades;
   (b) driving means for driving said shutter blades; said driving means being arranged to drive said shutter blades to open when driving means is energized;
   (c) optical detecting means for optically detecting an operating state of said shutter blades; and
   (d) control means for controlling an opening speed of said shutter blades by varying an amount of electric energy supplied to said driving means in response to an output of said optical detecting means, said control means including switching means for changing the opening speed of said shutter blades from one speed to another and brightness discriminating means for shifting a position of said switch means to change the opening speed of said shutter blades according to a brightness of external light in a flash photographing mode, wherein said brightness discriminating means includes shifting means for shifting the position of said switch means to lower the opening speed of said shutter blades in response to darkness of the external light.

3. A camera, comprising:
   (a) shutter blades;
   (b) driving means for driving said shutter blades, said driving means being arranged to drive said shutter blades to open when driving means is energized;
   (c) optical detecting means for optically detecting an operating state of said shutter blades; and
   (d) control means for controlling an opening speed of said shutter blades by varying an amount of electric energy supplied to said driving means in response to an output of said optical detecting means;
   (e) abnormal state detecting means for detecting an abnormal operation of the shutter blades in response to the output of the optical detecting means; and
   (f) prohibition means for prohibiting operations of the camera in response to the detection of the abnormal operation of the shutter by the abnormal state detecting means.

4. A camera according to claim 3, wherein said abnormal state detecting means includes a timer means for detecting the speed of the shutter blades.

5. A camera comprising:
   (A) shutter blades;

(B) driving means for driving the shutter blade, said driving means driving the shutter blades to open upon application of current thereto; and (C) control means for changing an opening speed of the shutter blades by changing a amount of current applied to the driving means, said control means controlling the opening speed of the shutter blades lower in flash photography than in normal photography.

6. A camera according to claim 5, wherein said control means includes shifting means for shifting the opening speed of the shutter blades to be higher when field brightness is bright in the flash photography than when the field brightness is dark.

7. A camera according to claim 5, wherein said optical detecting means includes a photo-interrupter.

* * * * *